(12) United States Patent
Zhang et al.

(10) Patent No.: US 9,307,252 B2
(45) Date of Patent: Apr. 5, 2016

(54) VIEW SYNTHESIS DISTORTION MODEL FOR MULTIVIEW DEPTH VIDEO CODING

(75) Inventors: Yun Zhang, Shenzhen (CN); Sam Tak Wu Kwong, QuarryBay (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 606 days.

(21) Appl. No.: 13/488,127

(22) Filed: Jun. 4, 2012

(65) Prior Publication Data

US 2013/0321574 A1 Dec. 5, 2013

(51) Int. Cl.
*H04N 19/154* (2014.01)
*H04N 19/597* (2014.01)
*H04N 19/172* (2014.01)
*H04N 19/115* (2014.01)
*H04N 13/00* (2006.01)
*H04N 19/147* (2014.01)
*H04N 19/124* (2014.01)

(52) U.S. Cl.
CPC .......... *H04N 19/154* (2014.11); *H04N 19/115* (2014.11); *H04N 19/172* (2014.11); *H04N 19/597* (2014.11); *H04N 13/0048* (2013.01); *H04N 19/124* (2014.11); *H04N 19/147* (2014.11); *H04N 2213/003* (2013.01)

(58) Field of Classification Search
CPC .......... H04N 13/0011; H04N 13/0018; H04N 19/00769; H04N 13/0278; H04N 19/154; H04N 19/115; H04N 19/172; H04N 19/597; H04N 19/124; H04N 19/147; H04N 13/0048
USPC ............................................ 348/43; 375/240
See application file for complete search history.

(56) References Cited

U.S. PATENT DOCUMENTS

| 6,141,446 A * | 10/2000 | Boliek et al. ................ 382/233 |
| 7,558,432 B2 | 7/2009 | Zaharia et al. |
| 2007/0165717 A1* | 7/2007 | Ye ........................... 375/240.16 |
| 2010/0231688 A1 | 9/2010 | Park et al. |
| 2010/0239180 A1 | 9/2010 | Yea et al. |
| 2010/0284466 A1 | 11/2010 | Pandit et al. |
| 2011/0038418 A1* | 2/2011 | Pandit et al. ............ 375/240.16 |
| 2011/0122225 A1 | 5/2011 | Kim et al. |

(Continued)

OTHER PUBLICATIONS

Liu, et al., "Joint Video/Depth Rate Allocation for 3D Video Coding Based On View Synthesis Distortion Model," Signal Processing: Image Communication, 24 (2009), pp. 666-681.*

(Continued)

*Primary Examiner* — Thai Tran
*Assistant Examiner* — Christopher T Braniff
(74) *Attorney, Agent, or Firm* — Amin, Turocy & Watson, LLP

(57) ABSTRACT

The disclosed subject matter relates to providing a view synthesis distortion model (VSDM) for multiview video coding (MVC). The disclosed VSDM can facilitate determining quantization values and rate values based on model parameters for encoding depth information. Further, the VSDM can facilitate compression of depth information based on the determined quantization values and rate values. Compression of depth information can provide for reduces bandwidth consumption for dissemination of encoded multiview content for applications such as 3D video, freepoint TV, etc. Further, a feedback element can be employed to update the VSDM based on a comparison of a reconstituted version of the content, from coded depth information, against reference version of the content, from reference depth information.

25 Claims, 17 Drawing Sheets

(56) References Cited

U.S. PATENT DOCUMENTS

2011/0200108 A1* 8/2011 Joshi et al. ............... 375/240.16
2011/0216833 A1 9/2011 Chen et al.
2011/0273529 A1 11/2011 Lai et al.

OTHER PUBLICATIONS

Liu et al., "Joint Video/Depth Rate Allocation for 3D Video Coding Based On View Synthesis Distortion Model," Signal Processing: Image Communications, 24 (2009) 666-681.*
Muller and Wiegand, "3-D Video Representation Using Depth Maps," Proceedings of the IEEE, vol. 99, No. 4, Apr. 2011, pp. 463-656.*
J. Lee, H. Wey, and D. Park, "A Fast and Efficient Multiview Depth Image Coding Method Based on Temporal and Inter-View Correlations of Texture Images," IEEE Trans. Circuits Syst. Video Technol., vol. 21, No. 12, pp. 1859-1868, Dec. 2011.
H. Yuan, Y. Chang, J. Huo, F. Yang, and Z. Lu, "Model Based Joint Bit Allocation Between Texture Videos and Depth Maps for 3D Video Coding," IEEE Trans. Circuits Syst. Video Technol., vol. 21, No. 4, pp. 485-497, Apr. 2011.
C. Fern. "Depth-Image-Based Rendering (DIBR), Compression and Transmission for a New Approach on 3D-TV," in Proc. SPIE Stereoscopic Displays and Virtual Reality Systems XI, pp. 93-104. 2004.
M. Tanimoto, T. Fujii, and K. Suzuki, "Improvement of Depth Map Estimation and View Synthesis," ISO/IECJTC1/SC29/WG11, M15090, Antalya, Turkey, Jan. 2008.
N. Kamaci, Y. Altinbasak, and R.M. Mersereau, "Frame Bit Allocation for the H.264/AVC Video Coder via Causdy Density-based Rate and Distortion Model", IEEE Trans. Circuits Syst. Video Technol., vol. 15, No. 8, pp. 994-1006, Aug. 2005.
H. Wang and S. Kwong, "A Rate-distortion Optimization Algorithm for Rate Control in H.264", in Proc. IEEE ICASSP'07, Apr. 2007, pp. 1149-1152 http://ispl.korea.ac.kr/conference/ICASSP2007/pdfs/0101149.pdf.
K.Takagi, Y. Takishima and Y. Nakajima, A Study on Rate Distortion Optimization Scheme for JVT Coder, Visual Communications and Image Processing(VCIP), vol. 5150, 2003, pp. 914-923.

* cited by examiner

VIEW SYNTHESIS DISTORTION MODEL FOR MULTIVIEW DEPTH VIDEO CODING

TECHNICAL FIELD

The various embodiments of the subject disclosure relate generally to video coding, e.g., to the application of a distortion model to multiview video coding.

BACKGROUND

Multiview Video Coding (MVC) is an amendment to the H.264/Moving Picture Experts Group-4 (MPEG-4) Advanced Video Coding (AVC) video compression standard developed with joint efforts by MPEG/Video Coding Experts Group (VCEG) that enables encoding on a video stream of frame sequences captured contemporaneously from two or more cameras. MVC can be used for encoding stereoscopic video, free viewpoint television, multi-view three-dimensional (3D) video, etc. An MVC stream is generally backward compatible with H.264/AVC, which allows older devices and software to decode multiview video coded streams by employing only content associated with a first camera view and ignoring any additional information associated with other camera views.

As an overview, multiview video can capture a scene from two or more viewpoints resulting in high levels of statistical dependencies between groups of pictures (GOPs) from each view. Similarly, within a GOP for a single view, there can be high levels of intra-view statistical dependencies that would be common for coding a conventional single camera stream. Typically, a frame from a first camera view can be predicted not only from temporally related frames from the same camera view, but also from the frames of neighboring cameras with alternate camera views. This can be commonly referred to as prediction from a matrix of pictures (MOP). The MOP is commonly 'n' views by 'k' frames, e.g., each group of pictures has k frames contemporaneously captured by n camera views resulting in n groups of pictures. As an example, a 3×30 MOP can have three GOPs, wherein each GOP has 30 frames. As such, MVC is commonly associated with large quantities of data and improvements in compression techniques and codecs would therefore help to reduce the bandwidth requirements for transmitting a coded video stream.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that facilitates multiview video coding employing a view synthesis distortion model. The system can include a memory and processor for storing and executing computer-readable instructions. The execution of the instructions can cause an encoder to be received. The system can encode at least a portion of the multiview input stream based on the encoder and view synthesis distortion model.

In another embodiment, the disclosed subject matter can be in the form of a method. The method can include receiving an encoder facilitating encoding of the multiview input stream. The method can further facilitate encoding the multiview input stream based, at least in part, on a view synthesis distortion model and the encoder.

In a further embodiment, the disclosed subject matter can be in the form of computer-executable instructions stored on a computer-readable storage medium. The computer-executable instructions can include receiving an encoder facilitating encoding of the multiview depth input stream. The computer-executable instructions can further facilitate encoding the multiview depth input stream based at least in part on a view synthesis distortion model and the encoder.

In an additional embodiment, the disclosed subject matter can be a system having a means for receiving a multiview input stream including depth information, means for receiving an encoder for coding at least a portion of the multiview input stream, means for receiving a view synthesis distortion model including a slope parameter and a residual parameter. Moreover, the system can also include a means for encoding the at least a portion of the multiview input stream based on the encoder and the view synthesis distortion model.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

Figure 1:
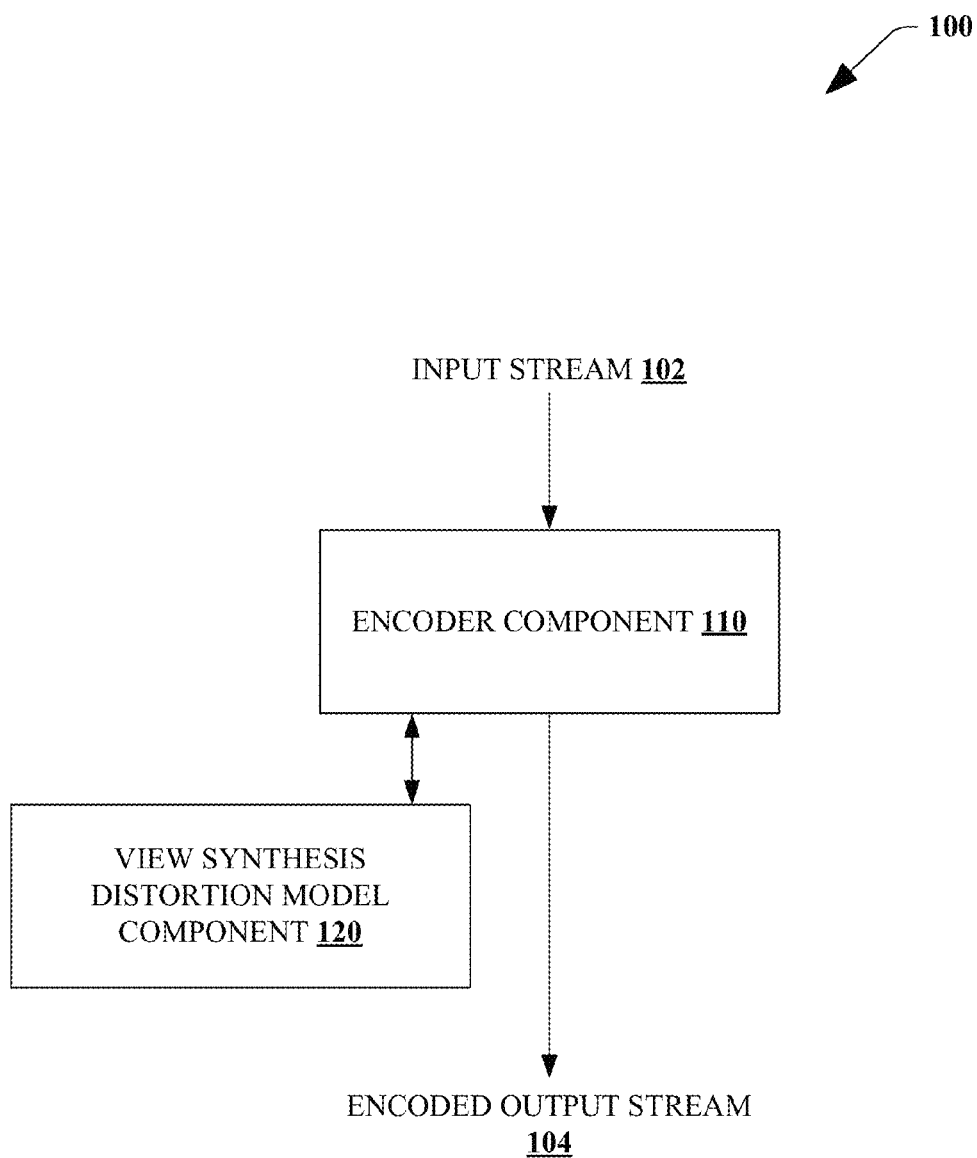
FIG. 1 is a diagram of a system that can facilitate multiview video coding (MVC) based on a view synthesis distortion model (VSDM) in accordance with an aspect of the subject matter disclosed herein.

The presently disclosed subject matter provides a view synthesis distortion model (VSDM) for multiview video coding (MVC). In an aspect, MVC can include encoding video frames, e.g., frames from one or more group of pictures (GOPs). Video frames can generally embody image texture information. In a further aspect, MVC can include encoding depth frames. Depth frames can embody depth information corresponding to a video frame. Depth information, generally, can be employed in mapping video frame information in virtual view images to provide a sensation of depth to a rendered image, e.g., 3D video, freeview content, etc. Whereas video coding for video frames for traditional single-viewpoint video can be considered relatively mature, the discussion presented herein is generally directed to encoding of depth frames. Of note, the terms depth frame, depth video, depth GOP, depth image, or other similar terms, can be employed interchangeably herein, unless otherwise specifically disclosed.

The use of a VSDM for MVC coding of depth frames, e.g., multiview depth video coding (MDVC), can facilitate compression of depth information. Where depth information is compressed, transmission of such compressed depth information can require less bandwidth than less compressed or non-compressed depth information. Lower bandwidth requirements are generally desirable. Further, compression of depth frames can facilitate compression of depth information at particular quality levels. In an aspect, rate-distortion adaptation (RDA) can be employed with a VSDM to adapt the encoding rate of depth video to meet specified quality parameters. Further, regional bit allocation (RBA) can be employed with a VSDM to facilitate allocation of bits to select regions of a depth frame in a manner that can reduce overall distortion. As an example, regions of the depth frame correlating to texture regions of a video frame can be allocated more coding bits than are allocated to regions of the depth frame correlating to smooth regions of the video frame.

As such, the present disclosure can provide regional bit allocation and rate-distortion adaptation for MVC, and more particularly for multiview depth video coding, which can improve coding efficiency by using the regional properties of depth video. A view synthesis distortion model is disclosed that can establish a relationship between depth distortion and view synthesis distortion for different types of regions in the depth video. Based on a VSDM, regional bit allocation can compress depth frames while maintaining a predetermined virtual view rendering quality by selectively allocating bits to particular regions of a depth frame. Moreover, rate-distortion adaptation can include a novel Lagrangian multiplier that can reduce view synthesis distortion and bit rate. Experimental results of compression employing a VSDM for MDVC achieve notable bit rate savings for both high and low bit rates coding. Further, virtual view image quality can be generally improved where video quality is a higher priority than reduction in bandwidth. The disclosed subject matter can be applied to both INTRA-type frames and/or INTER-type frames. As such, the present disclosure applied to a depth video encoder can improve coding efficiency and can be adopted in 3D video applications, such as 3D TV and free-view point TV, etc.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate multiview video coding (MVC), and more particularly multiview depth video coding (MDVC), based on a view synthesis distortion model (VSDM) in accordance with an aspect of the subject matter disclosed herein. System 100 can include an encoder component 110 that can receive and encode an input stream 102 into an encoded output stream 104. Encoder component 110 can encode depth frames that correlate to video frames. Encoder component 110 can employ codices for coding input stream 102. Encoder component 110 can include an encoder, decoder, or codec. For example, an MPEG codec can be both an encoder and a decoder. A codec can provide mechanisms for compression of input stream 102, such that encoded output stream 104 can have a lower bandwidth than input stream 102 for carrying a facsimile of the original content at a particular level of quality. In an embodiment, encoder component 110 can include an H.264/AVC type codec. Of note, often the term codec can often be used interchangeably with the terms encoder or decoder in that a codec may include both an encoder and decoder, however, as used herein, the term codec can mean an encoder, a decoder, or both an encoder and decoder.

Encoder component 110 can be communicatively coupled to view synthesis distortion model component 120. VSDM component 120 can facilitate employment of a VSDM to affect transformation of input stream 102 into encoded output stream 104 by encoder component 110. The VSDM can model relationships between depth distortion and virtual view images. As such, parameter selection for encoding can be adapted based, at least in part, on the VSDM.

Figure 2:
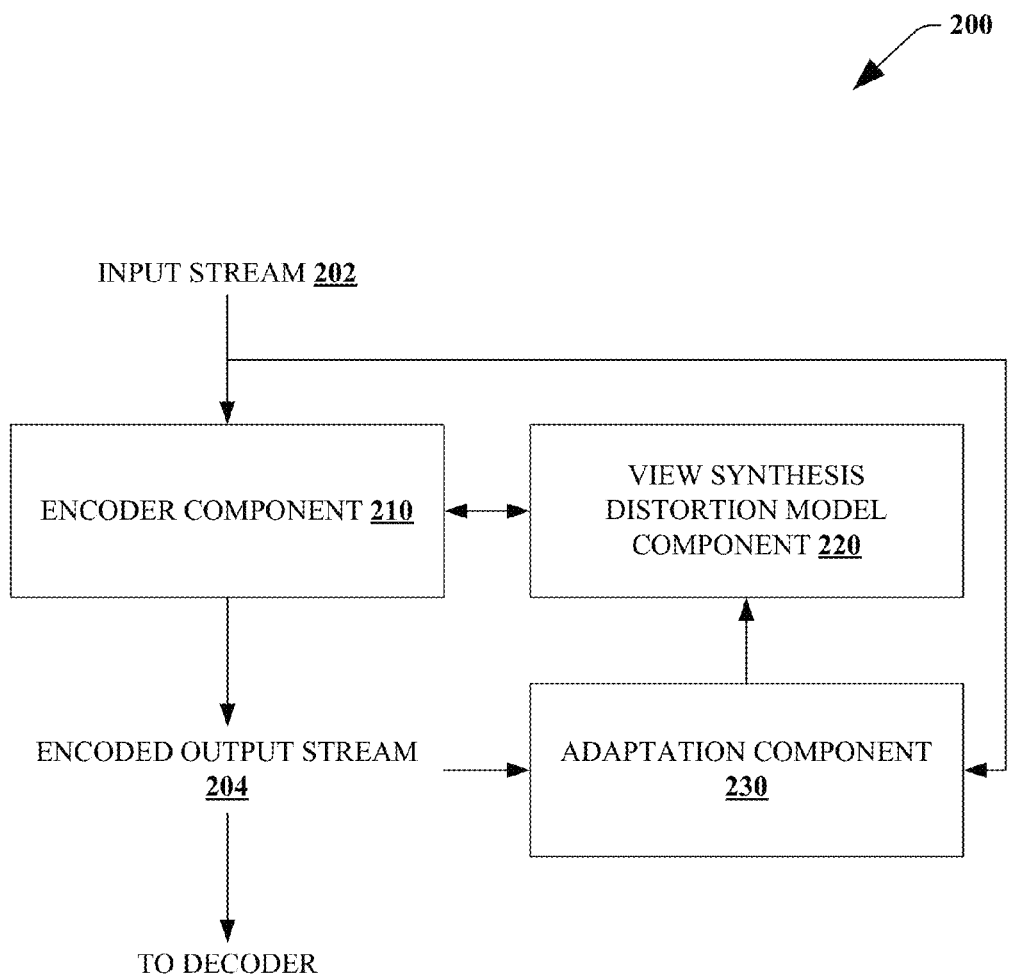
FIG. 2 illustrates an exemplary system that can facilitate MVC based on a VSDM in accordance with an aspect of the disclosed subject matter.

FIG. 2 depicts an exemplary system 200 that can facilitate MVC based on a VSDM in accordance with an aspect of the disclosed subject matter disclosed herein. System 200 can include encoder component 210 that can receive and code input stream 202 into encoded output stream 204. Encoded output stream 204 can eventually be made available to a decoder at some downstream point. Encoder component 210 can be communicatively coupled to VSDM component 230. VSDM component 230 can facilitate employment of a VSDM as part of encoding input stream 102 at encoder component 210.

VSDM component 220 can be communicatively coupled to adaptation component 230. Adaptation component 230 can further be coupled to input stream 202 and encoded output stream 204. In an aspect, adaptation component 230 can include decoder features to decode encoded output stream 204. Adaptation component 230 can compare video reconstituted from input stream 202 information with video reconstituted from encoded output stream 204. Wherein encoded output stream 204 is encoded based in part on a VSDM by way of VSDM component 220, the comparison at adaptation component 230 can be correlated to parameters of the VSDM such that the VSDM can be adapted. In an aspect, adaptation component 230 can provide a feedback loop to update the VSDM based on the encoding of a video stream.

Figure 3:
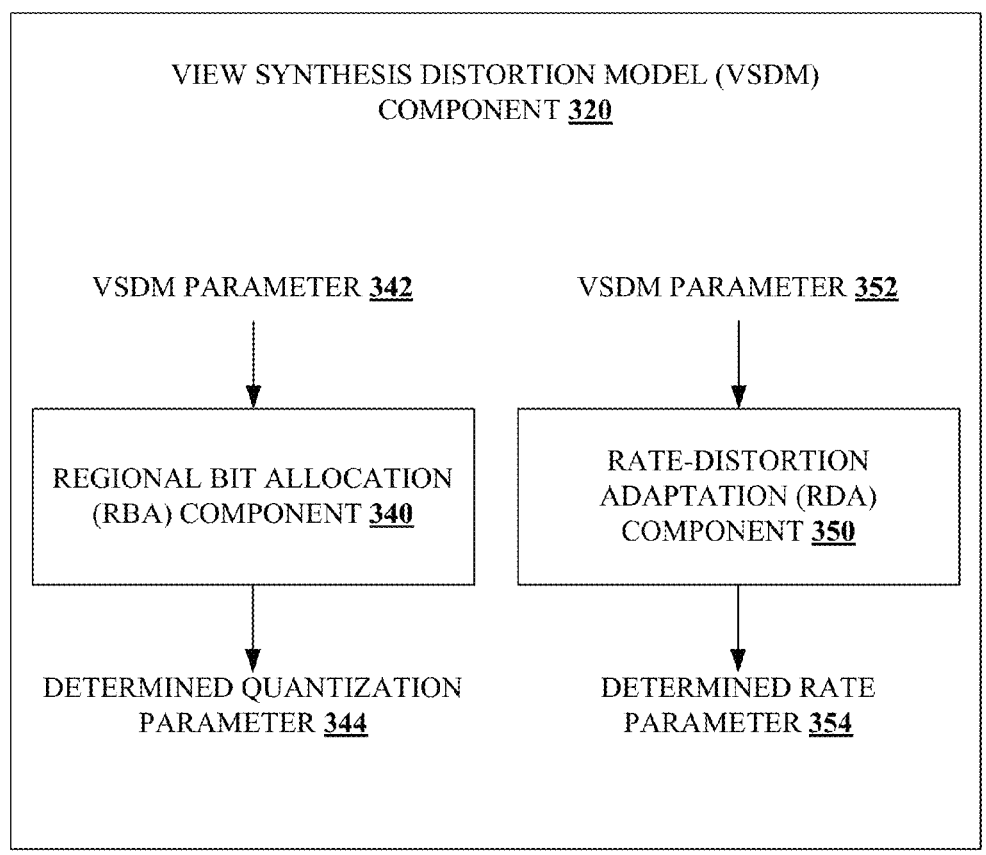
FIG. 3 is a diagram of a system that can facilitate VSDM based regional bit allocation (RBA) and rate-distortion adaptation (RDA) in accordance with an aspect of the disclosed subject matter.

Turning now to FIG. 3, presented is a diagram of a system 300 that can facilitate VSDM based regional bit allocation (RBA) and rate-distortion adaptation (RDA) in accordance with an aspect of the subject matter disclosed herein. System 300 can include VSDM component 320 which can further include RBA component 340 and RDA component 350. RBA component 340 can determine a quantization parameter 344 based on one or more VSDM parameter(s) 342. As an example, where an edge is detected in a region of a depth frame, the VSDM parameter 342 can indicate a corresponding slope. Based on this slope, RBA component 340 can determine a quantization parameter facilitating more sensitive encoding of the edge so as to allow accurate recreation of the edge as part of future decoding. RDA component 350 can determine a rate parameter 354 based, at least in part, on receiving at least one VSDM parameter 352.

Figure 4:
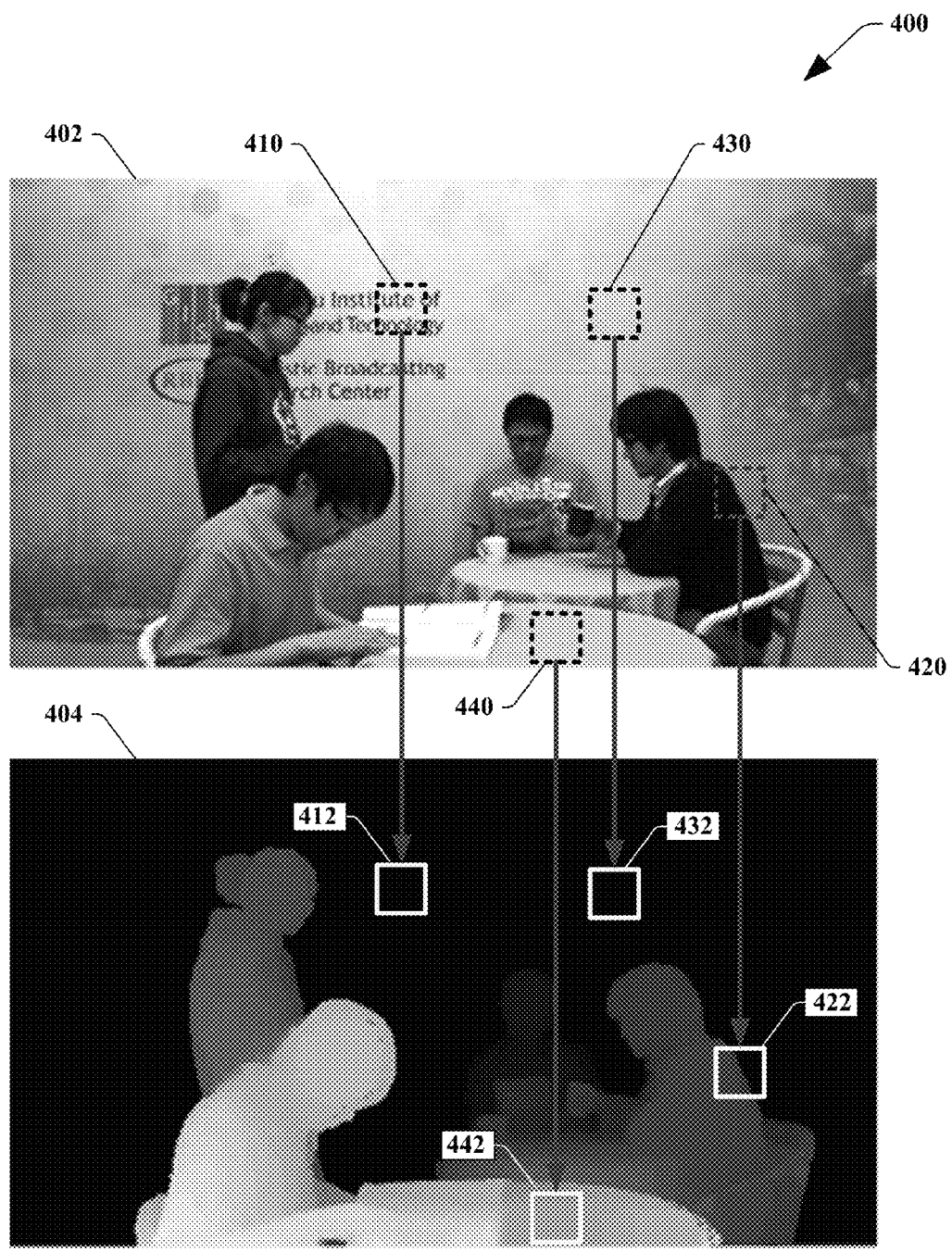
FIG. 4 illustrates an exemplary video frame and corresponding exemplary depth frame that can facilitate MVC based on a VSDM in accordance with an aspect of the disclosed subject matter.

FIG. 4 illustrates an exemplary frame set 400 including video frame 402 and corresponding depth frame 404 that can facilitate MVC based on a VSDM in accordance with an aspect of the disclosed subject matter. Generally, depth distortion in a textural area, such as region 410 of video frame 402, can be associated with virtual view image (VVI) quality degradation, caused by incorrect pixel mapping, which is typically more severe than VVI quality degradation associated with smooth areas of a video frame, such as region 430 of video frame 402. A video frame can be divided into two kinds of regions, a color texture area (CTA) indicating higher texture in that region of a video frame and color smooth area (CSA) indicating lower texture in that region of a video frame. Examples of CTA can include regions 410 and 420 of image 402. Examples of CSA can include regions 430 and 440 of image 402.

CTA and CSA regions of a video frame can be mapped to corresponding regions of a correlated depth frame. These corresponding regions can be termed as CTA depth (CTAD) regions and CSA depth (CSAD) regions. Examples of CTAD regions can include CTAD region 412 of image 404, corresponding to CTA region 410 of image 402, and CTAD region 422 of image 404, corresponding to CTA region 420 of image 402. Examples of CSAD regions can include CSAD region 432 of image 404, corresponding to CSA region 430 of image 402, and CSAD region 442 of image 404, corresponding to CSA region 440 of image 402. Of note, CTAD regions can include depth edges and depth smooth areas that are not present in a corresponding video image. Further, a CTAD region size can be based on CTA size. As such, the depth image can generally be divided into CTAD and CSAD regions in the same manner that a video image can be generally divided into CTA and CSA regions. The significance of these regions will be further illuminated herein below in close relation to the mathematical discussion. It will further be noted that while CTAD and CSAD are only one exemplary type of region classification for depth images based on source image texture, nearly any other classification scheme for depth images can be employed without departing from the presently disclosed subject matter and, as such, while the present disclosure discusses primarily CTAD and CSAD classifications for clarity and brevity, the disclosure is not so limited. In some embodiments, a multi-level classification of macroblock units can be implemented in a manner similar to, or the same as, that disclosed for CTAD and CSAD classifications while remaining within the scope of the present disclosure. Of note, multiple classes are possible for one depth image, wherein each class can be represented with one or more macroblock units.

FIGS. 5 and 14-16 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

Figure 5:
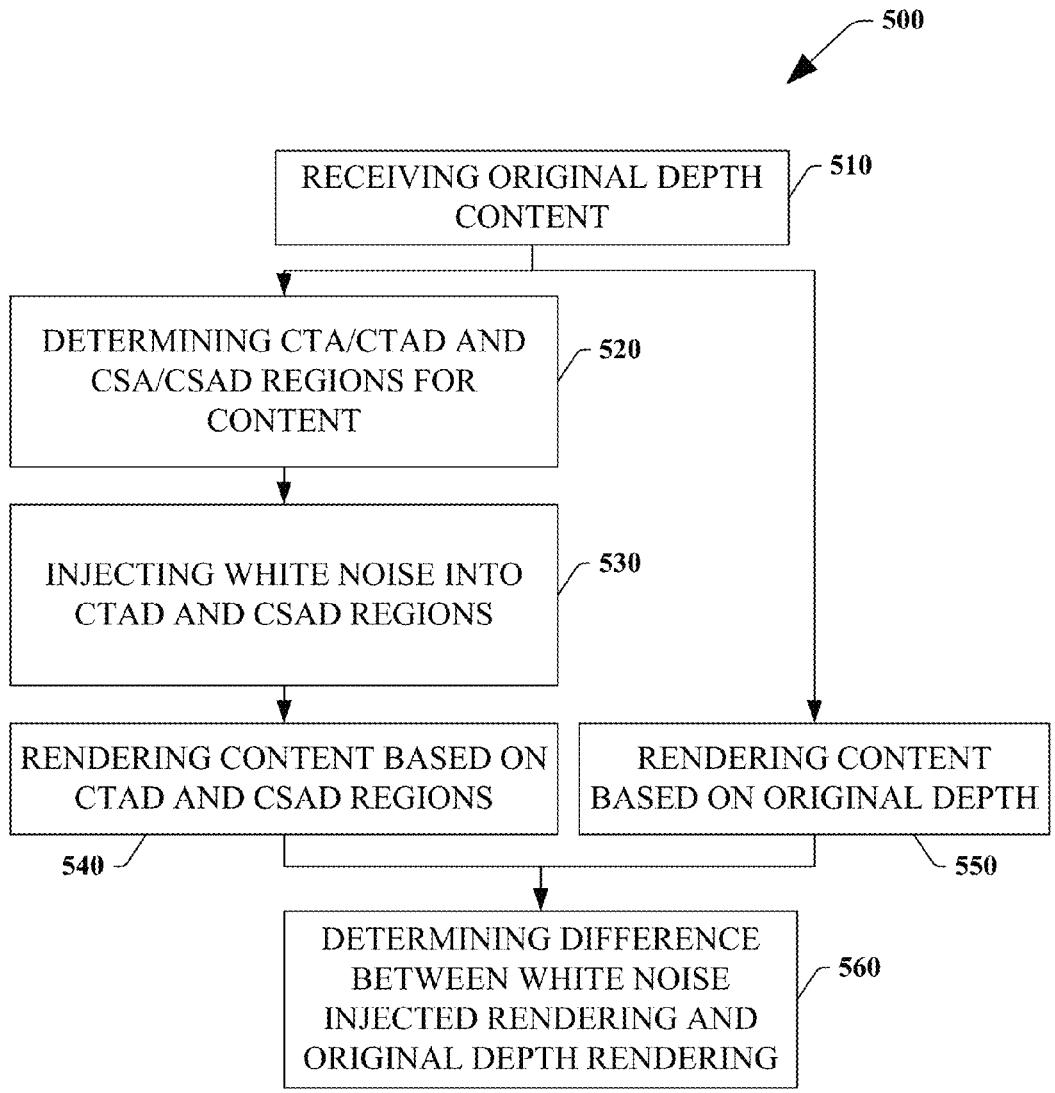
FIG. 5 illustrates a method that facilitates determining the effects of white noise injection in relation to developing a VSDM in accordance with an aspect of the disclosed subject matter.

Turning to FIG. 5, illustrated is a method 500 that facilitates determining the effects of white noise injection in relation to developing a VSDM in accordance with an aspect of the disclosed subject matter. Quantization error can be similar to zero mean white noise. As such, white noise with zero mean can be injected into the CTAD and CSAD regions as a perturbation of those regions mimicking quantization error. Different white noise intensity can be selected for injection so as to interrogate the distortion of a synthesized virtual view.

Method 500 generally discloses a flowchart of an exemplary distortion analysis experiment. At 510, original depth content can be received. At 520, CTA/CTAD and CSA/CSAD regions can be determined for the video/depth frames of the content at 510. At 530, white noise can be injected into the CTAD and CSAD regions. The content can then be rendered at 540 based on the perturbed CTAD and CSAD regions. At 550, the content can be rendered based on the original depth content from 510. Of note, the rendering at 550 is without perturbation by injection of white noise. At 560, the difference between the perturbed and unperturbed rendering can be determined. This difference can be modeled for various white noise injections. Moreover, the white noise injections for the textured regions, e.g., CTA/CTAD, can be different from the white noise injections for the smooth regions, e.g., CSA/CSAD.

In an exemplary distortion analysis, CTA and CSA regions can be detected based on a Canny operator applied to a video frame. A detected edge can be converted into a 16×16 macroblock (MB) based on the count of edge pixels in one MB transitioning a threshold value $N_e$. Let $I_T$ be white noise intensity in CTAD regions and $I_S$ be white noise intensity in CSAD regions. As an example, $I_T$ can be a set {1, 2, 3, 4, 5, 6, 7, 8, 9, 10, 12, 14, 16, 18, 20} and $I_S$ can be a set {1, 5, 10, 15, 20, 25, 30, 35, 40, 45, 50}. These exemplary $I_T$ and $I_S$ sets can be employed for analysis of video sequences. Where the video sequences have different textural and smooth character, the resulting effects of white noise perturbation can be expected to be different. The peak signal-to-noise ratio (PSNR) can be calculated between the VVIs synthesized from perturbed depth frames, e.g., wherein CTAD and CSAD are perturbed, and the content resulting from the original depth frame. Of note, a rendering image generated from original depth video can be regarded as a best quality image to employ as a baseline. Results of exemplary perturbation experiments are presented in FIGS. 6 and 7 for the standard Café image and standard Balloons image.

Figure 6:
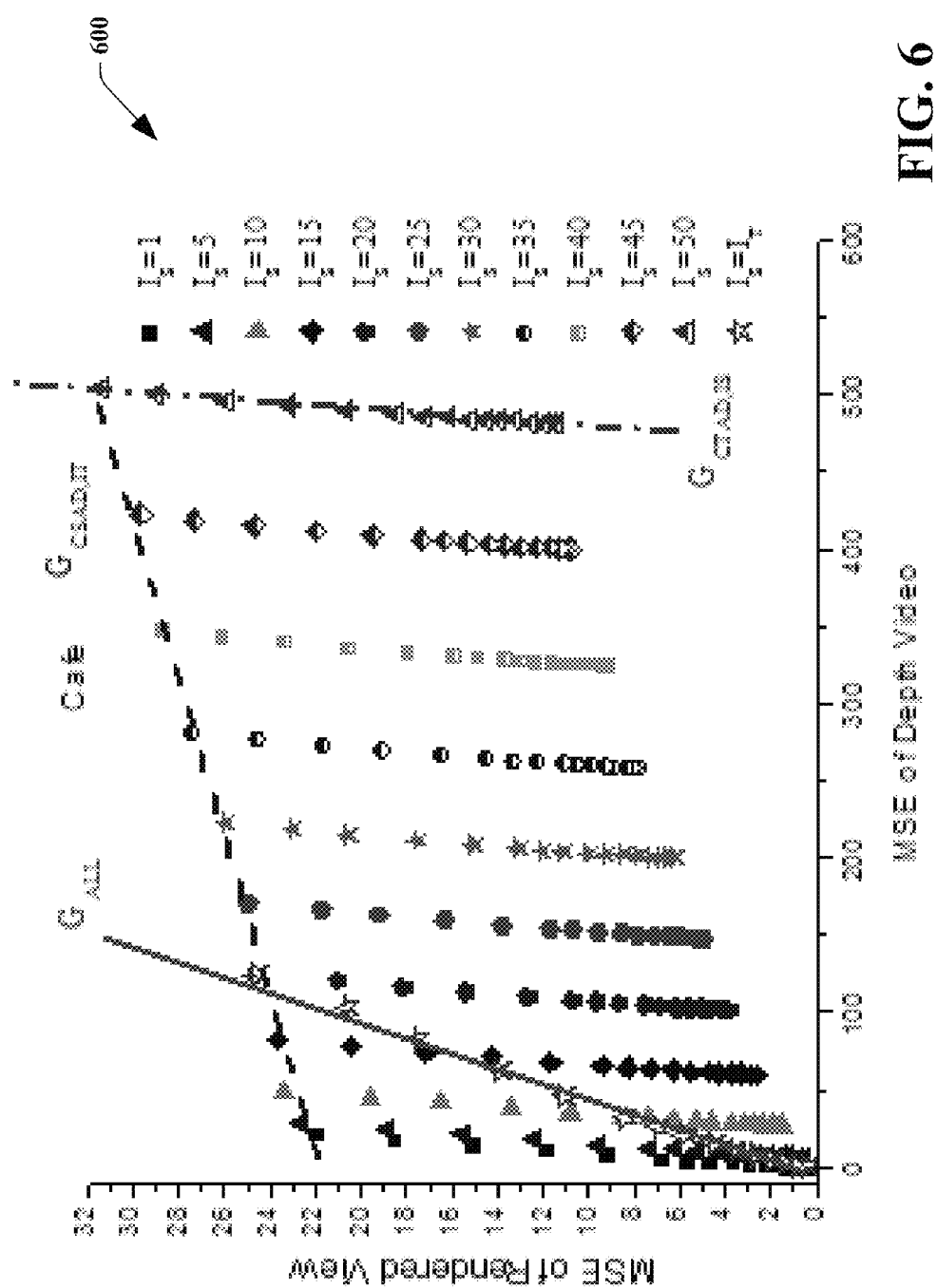
FIG. 6 illustrates a plot of exemplary data related to development of a VSDM in accordance with an aspect of the disclosed subject matter.
Figure 7:
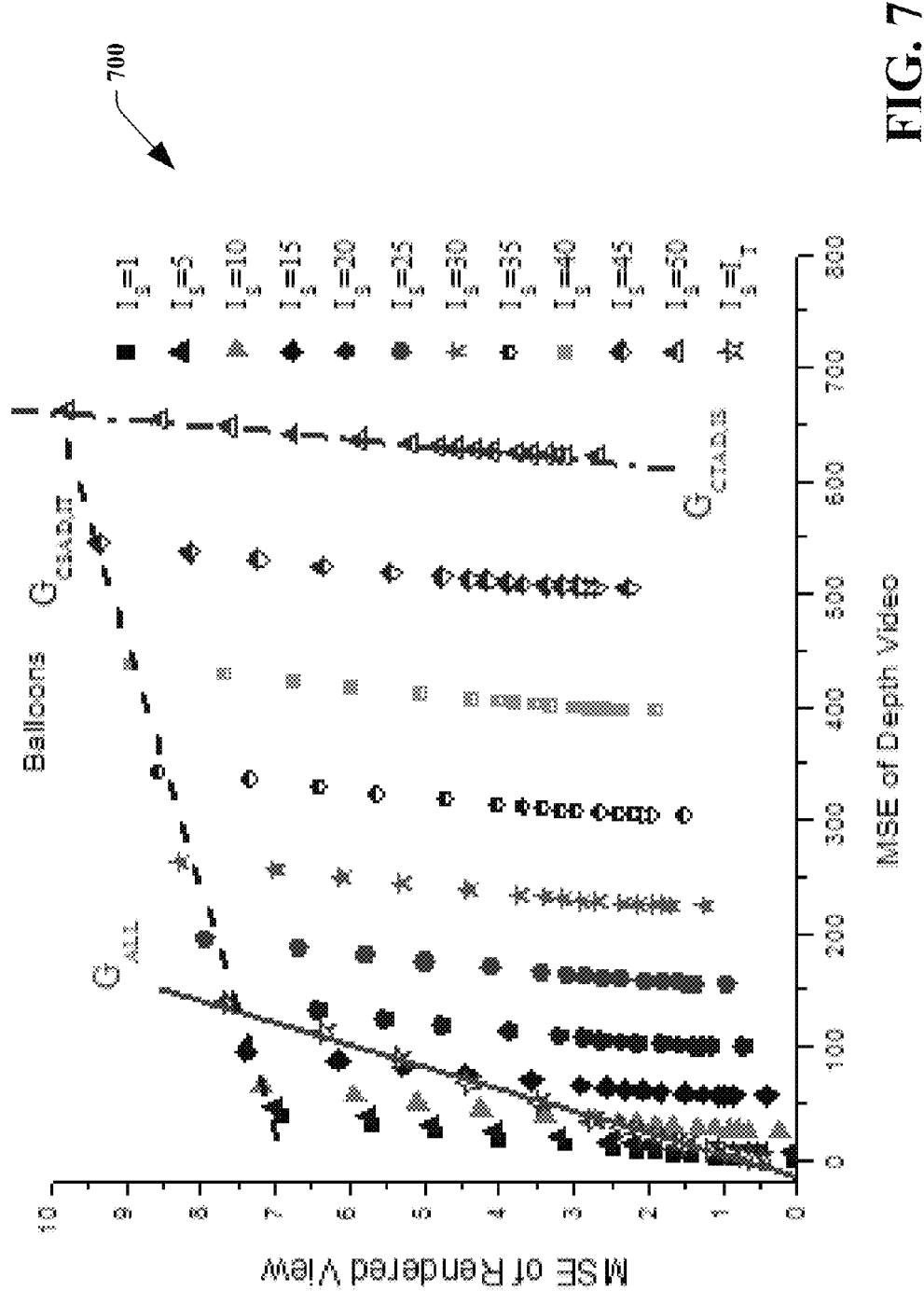
FIG. 7 depicts a plot of exemplary data related to development of a VSDM in accordance with an aspect of the disclosed subject matter.

FIGS. 6 and 7 illustrate plots 600 and 700, respectively, the plots relating exemplary data related to development of a VSDM in accordance with an aspect of the disclosed subject matter. Plot 600 illustrates the effects of perturbation of CTAD and CSAD regions for the standard Café image. Plot 700 illustrates the effects of perturbation of CTAD and CSAD regions for the standard Balloons image. In these particular examples, the set of $I_T$ values is {1, 2, 3, 4, 5, 6, 7, 8, 9, 10, 12, 14, 16, 18, 20} and the set of $I_S$ values as {1, 5, 10, 15, 20, 25, 30, 35, 40, 45, 50}. The y-axis of plots 600 and 700 depict the rendering image distortion measured as Mean Square Error (MSE), denoted by $MSE_{VS}$. The x-axis of plots 600 and 700 is the average depth image quality, measured as MSE and denoted by $MSE_D$.

In an aspect, plots 600 and 700 illustrate white noise injected into CSAD regions, as represented by the several groups of data for the indicated $I_S$ values. Linear fitting within a set of symbols, within a single $I_S$ value, illustrates a trend for the set of $I_T$ values for a fixed $I_S$ value. These generally result in steeply sloped linear trend lines indicating that relatively small changes in the MSE of the depth video results in relatively large changes in the MSE of the rendered VVI for perturbation of the CTAD regions. As such, it can be surmised that quantization error in textured regions, e.g., CTAD regions, can result in significant error in an image rendered from the compressed stream. The slopes of the lines are similar to the trend lines labeled $G_{CTAD,IS}$, in plots 600 and 700.

Similarly, plots 600 and 700 also illustrate white noise injected into CTAD regions, as represented by the several groups of data for the indicated $I_T$ values. The trend line labeled $G_{CSAD,IT}$, in plots 600 and 700, illustrates behavior for a fixed $I_T$ value across the set of $I_S$ values. These generally result in slightly sloped linear trend lines indicating that changes in the MSE of the depth video is less strongly correlated with large changes in the MSE of the rendered VVI for perturbation of the CSAD regions. As such, it can be surmised that quantization error in smooth regions, e.g., CSAD regions, results in significantly less error in an image rendered from the compressed stream than for similar perturbations of textured regions, e.g., CTAD regions.

From the statistical experimental results represented as plots 600 and 700, it can generally be stated that view synthesis distortion is generally in a linear relationship with depth distortion for CSAD regions, CTAD regions, or the entire image. It can further be surmised that the slopes of CSAD, e.g., $G_{CSAD,IT}$, are much smaller than these of CTAD regions e.g., $G_{CTAD,IS}$. This can be interpreted to indicate that the distortion in CTAD regions affects VVI quality more severely than distortion in the CSAD regions. Additionally, the slope of the trend line between different $I_S$ values is similar, e.g., a small change in the MSE of the depth frame can generally be assumed to result in a prominent change in the MSE of an image from a compressed stream regardless of the quantization error in a CSAD region. Likewise, the slope of the trend lines between different $I_T$ values is also similar, e.g., a small change in the MSE of the depth frame can generally be assumed to result in a small change in the MSE of an image from a compressed stream regardless of the quantization error in a CTAD region. Of note, the slope of the trend line fits also vary from sequence to sequence, e.g., the slope of the trend lines are markedly different between plot 600 for the Café image sequence and plot 700 for the balloons image sequence. The plots illustrated in FIGS. 6 and 7 can be interpreted as demonstrating the general relationship between error in quantization of a depth image and the effects on a rendered image resulting from the coded depth image.

Based on the experimental analyses of the depth effects on the VVI rendering, it can be observed that the depth distortions in CTAD and CSAD have different impacts on the VVI quality. However, the slopes $G_{CTAD,IS}$ and $G_{CSAD,IT}$ not only change for different types of regions (CTAD and CSAD), but also vary from different kinds of video content and camera setting, etc. As such, it is inaccurate to predict the slopes with an average value of the statistical data.

Figure 8:
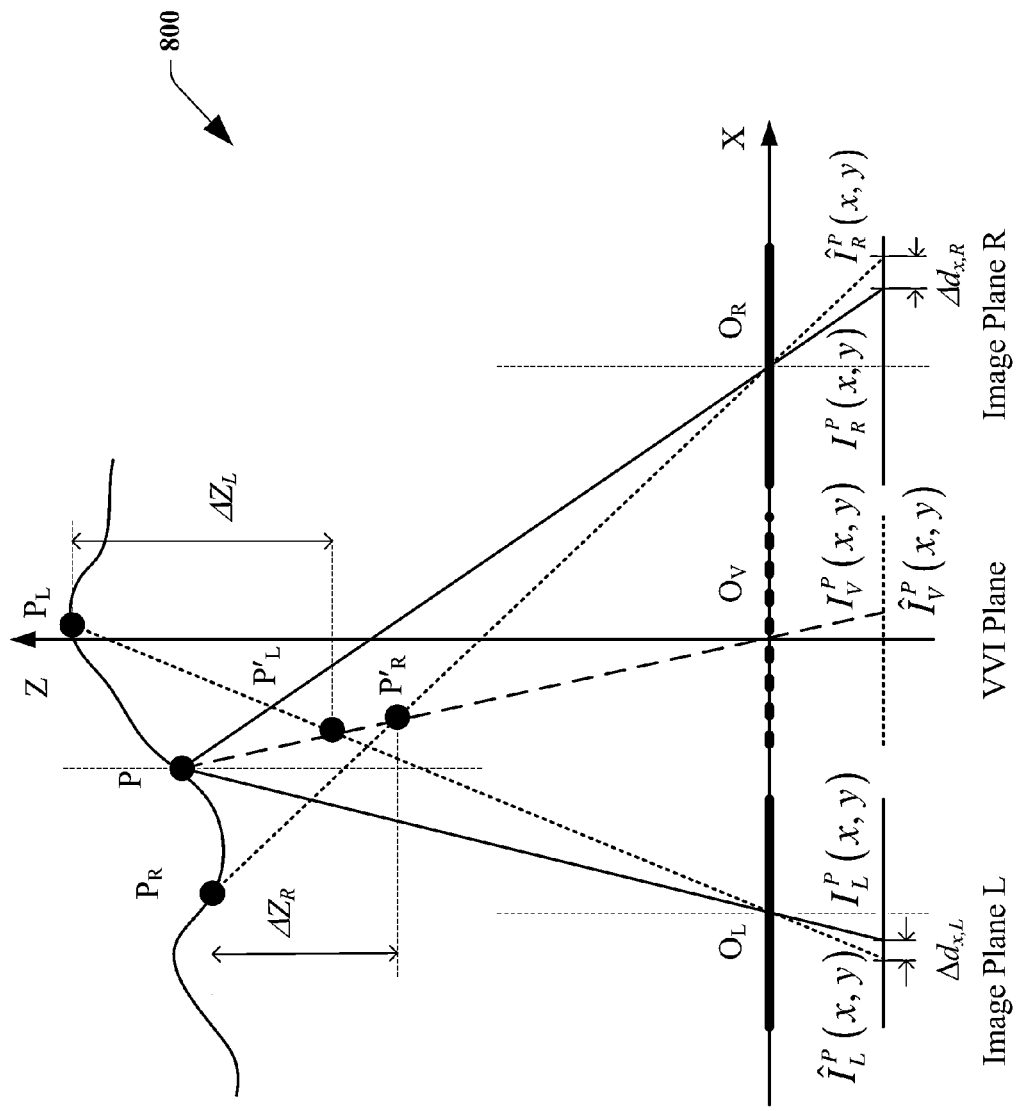
FIG. 8 depicts diagram of an exemplary view synthesis condition related to development of a VSDM in accordance with an aspect of the disclosed subject matter.

FIG. 8 depicts diagram 800 of an exemplary view synthesis condition related to development of a VSDM in accordance with an aspect of the disclosed subject matter. Diagram 800 illustrates exemplary pixel mapping for a virtual view image with depth frame values distorted by coding, e.g., compression. As such, diagram 800 can be assumed to illustrate aspects resulting from compression distorted depth video that can be correlated to the effects of the exemplary white noise injections disclosed herein. In diagram 800, $O_L$ and $O_R$ are optical centers for a left view and a right view, respectively. Further, $O_v$ is an optical center for the resulting virtual view. $I_V^P(x, y)$ can be a pixel at (x,y) of the VVI generated by view synthesis with original depth video. Image fusion techniques can be employed for VVI generation. A first exemplary image fusion technique can be a weighted fusion in which each virtual view pixel is weighted and calculated from visible pixels of neighboring views. A second exemplary image fusion technique can be based on one rendered image, and pixels can be selected from another view to fill a hole and occlusion area, which can be regarded as a special case of the aforementioned weighted fusion technique. As such, the $I_V^P(x, y)$ can be calculated as, $$I_V^P(x, y) = \omega_L I_L^P(x, y) + \omega_R I_R^P(x, y), \quad (1),$$

where $\omega_L$ and $\omega_R$ are weighted coefficients depending on the view rendering algorithm, virtual view position and occlusions, they satisfy $\omega_L + \omega_R = 1$, $I_L^P(x, y)$ are pixels at the left view, and $I_R^P(x, y)$ are pixels at the right views. For the second view synthesis case, $\omega_L$ and $\omega_R$ are either 1 or 0. Similarly, $\hat{I}_V^P(x, y)$ can be generated from virtual view synthesis with reconstructed depth video, wherein the reconstructed depth video has compression distortion, e.g., quantization error. As the VVI is generated from the reconstructed depth video, the value of pixel (x,y) is, $$\hat{I}_V^P(x, y) = \omega_L \hat{I}_L^P(x, y) + \omega_R \hat{I}_R^P(x, y), \quad (2),$$

The average distortion of virtual view for one MB caused by depth distortion can be calculated as, $$MSE_{VS} = \frac{1}{MN} \sum \sum |I_V^P(x,y) - \hat{I}_V^P(x,y)|^2 + \varepsilon, \quad (3)$$

where x and y are offset for each MB, and M and N indicate the height and width of a picture. For holes and float operation in the virtual view, the pixel mapping may not exactly the same as Eq. 1 and Eq. 2, therefore, $\varepsilon$ indicates the mapping difference associated with use of a post-processing algorithm. This value is generally very small while the depth distortion is small. Additionally, for a parallel camera setting, pixel $\hat{I}_L^P(x,y)$ on the image plane is the neighboring pixel of $I_L^P(x,y)$ with horizontal offset $\Delta d_{x,L}$ caused by the depth compression distortion, denoted by $I_L^P(x+\Delta d_{x,L}, y)$. By symmetry, this effect is similar for $\hat{I}_R^P(x,y)$. They can be expressed as, $$\begin{cases} I_L^P(x+\Delta d_L, y) = \hat{I}_L^P(x,y) \\ I_R^P(x+\Delta d_R, y) = \hat{I}_R^P(x,y), \end{cases} \quad (4)$$

where $\Delta d_{x,L}$ and $\Delta d_{x,R}$ are a horizontal pixel offset caused by depth distortion. Without loss of generality, depth distortion can cause both the horizontal and vertical offsets for non-parallel camera setting, that is, $$\begin{cases} I_L^P(x+\Delta d_{x,L}, y+\Delta d_{y,L}) = \hat{I}_L^P(x,y) \\ I_R^P(x+\Delta d_{x,R}, y+\Delta d_{y,R}) = \hat{I}_R^P(x,y), \end{cases} \quad (5)$$

where $\Delta d_{y,L}$ and $\Delta d_{y,R}$ are vertical pixel offset caused by depth distortion. Apply Eqs. 1, 2 and 5 to Eq. 3, $$\begin{aligned} MSE_{VS} &= \frac{1}{MN} \sum \sum |I_V^P(x,y) - \hat{I}_V^P(x,y)|^2 \quad (6) \\ &= \frac{1}{MN} \sum \sum \left| \omega_L[I_L^P(x,y) - \hat{I}_L^P(x,y)] + \omega_R[I_R^P(x,y) - \hat{I}_R^P(x,y)] \right|^2 \\ &= \frac{1}{MN} \frac{(\sum \sum \omega_L^2 [I_L^P(x,y) - I_L^P(x+\Delta d_{x,L}, y+\Delta d_{y,R})]^2 +}{\sum \sum \omega_R^2 [I_R^P(x,y) - I_R^P(x+\Delta d_{x,R}, y+\Delta d_{y,R})]^2) +} \\ &\quad C_{LR} \end{aligned}$$

where $$C_{LR} = \frac{1}{MN} \sum \sum \omega_L \omega_R [I_L^P(x,y) - \hat{I}_L^P(x,y)][I_R^P(x,y) - \hat{I}_R^P(x,y)]$$

for the first exemplary image fusion technique where $\omega_L$ and $\omega_R$ are non-zero and satisfy $\omega_L+1$. The item $C_{LR}$ is approximated as zero due to the law of large numbers. For the second exemplary image fusion technique, $C_{LR}$ is zero because one of $\omega_L$ and $\omega_R$ is 1 and the other is 0. Therefore, the average distortion $MSE_{VS}$ can be finally formulated as $$MSE_{VS} \approx \sum_{\phi \in \{L,R\}} \omega_\phi^2 MSE_\phi(\Delta d_{x,\phi}, \Delta d_{y,\phi}), \quad (7)$$

where $$MSE_\phi(\Delta d_{x,\phi}, \Delta d_{y,\phi}) = \frac{1}{MN} \sum \sum \left[ I_\phi^P(x,y) - I_\phi^P \begin{pmatrix} x+\Delta d_{x,\phi}, \\ y+\Delta d_{y,\phi} \end{pmatrix} \right]^2.$$

Wherein the distortion effects on the left view are similar to the right view, by symmetry only one view can be analyzed. Therefore, $\Delta d_{x,\phi}$ and $\Delta d_{y,\phi}$ can simply be denoted by vector $\Delta d_\phi$ to ease the following discussion. According to the virtual view synthesis process, the vertical and horizontal offset $\Delta d_\phi$ can be caused by depth distortion $\Delta v_\phi$, and the view synthesis distortion $MSE_{VS}$ can be derived from $\Delta d_\phi$. Therefore, the analysis of the relationship between depth distortion $\Delta v_\phi$ and view synthesis distortion $MSE_{VS}$, can be divided it into two steps. Firstly, establish the relationship between depth distortion $\Delta v_\phi$ and $\Delta d_\phi$, and secondly, the relationship between $MSE_{VS}$ and $\Delta d_\phi$.

The Relationship Between Pixel-wise Offset $\Delta d_\phi$ and the Depth Distortion $\Delta v_\phi$ Turning to the parallel camera setting geometry in diagram 800, based on the similar triangles in the $\phi$ image plane, $\phi \in \{L, R\}$, we can obtain the horizontal offset $\Delta d_{x,\phi}$ for the left and right views as $$d_{x,\phi} = l_\phi \cdot f_\phi \cdot \left[ \left( \frac{1}{Z_P} - \frac{1}{Z_\phi} \right) + \left( \frac{1}{Z_\phi} - \frac{1}{Z_\phi'} \right) \right], \quad (8)$$

where $Z_P$ is the depth of 3D world point P, $Z_\phi$ is the depth of point $P_{100}$, $Z'_\phi$ is the depth of $P'_\phi$ which mapped from $\hat{I}_L^P(x,y)$ with distorted depth, $l_\phi$ is the distance between optical center $O_V$ and $O_\phi$, $\phi \in \{L,R\}$, $f_\phi$ is the focus length of the camera $\phi$. Since the cameras of the array usually share the same intrinsic camera model, we can use focus length $f=f_\phi$.

In MPEG 3DV, a non-linear quantization process is adopted to transform depth Z to depth value v in 0 to 255 scale as $$v = Q(Z) = \left\lfloor 255 \frac{Z_{near}}{Z} \frac{Z_{far} - Z}{Z_{far} - Z_{near}} + 0.5 \right\rfloor, \quad (9)$$

where $Z_{near}$ and $Z_{far}$ are the nearest and furthest depth plane of the video scene, v is the quantized depth value with 8 bit depth. Thus, the inverse quantization process can be, $$Z = Q^{-1}(v) = \frac{1}{\frac{v}{255}\left(\frac{1}{Z_{near}} - \frac{1}{Z_{far}}\right) + \frac{1}{Z_{far}}}, \quad (10)$$

Therefore, substituting Eq. 10 into Eq. 8, can yield, $$d_{x,\phi} = l_\phi \cdot f \cdot C_1 \cdot [(v_P - v_\phi) + \Delta v_\phi], \quad (11)$$

where $$C_1 = \frac{1}{255}\left(\frac{1}{Z_{near}} - \frac{1}{Z_{far}}\right),$$

$\Delta v_\phi = v_\phi - v_\phi'$, $v_P$ and $v_\phi$ is the depth value of point P and $P_\phi$, respectively. Wherein depth is relatively smooth, $v_P - v_\phi$ is small for neighboring pixels and zero mean, thus Eq. 11 can be approximated to be, $$d_{x,\phi} \approx l_\phi \cdot f \cdot C_1 \cdot \Delta v_\phi. \quad (12)$$

According to Eq. 12, while rendering a virtual view, distance $l_\phi$, f and $C_1$ is given and fixed, thus, the $\Delta d_{x,\phi}$ can be directly proportional to the depth distortion $\Delta v_\phi$ in one view and it can be rewritten as, $$\Delta d_{x,\phi} \propto \Delta v_\phi \text{ or } \Delta d_{x,\phi} = k_{x,\phi} \Delta v_\phi, \quad (13)$$

where symbol "$\propto$" indicates the direct proportional relationship between the left and right variables of the equation, and $k_{x,\phi}$ is a constant as given v and $x_\phi$ for a given pixel. Since the camera geometry in diagram 800 is not only applicable to the horizontal direction, but also applicable to the vertical direction for other camera setting, such as a one dimensional (1D) arc. Similar to Eq. 13, the displacement in the y-axis can satisfy, $$\Delta d_{y,\phi} \propto \Delta v_\phi \text{ or } \Delta d_{y,\phi} = k_{y,\phi} \Delta v_\phi \quad (14)$$

where $k_{y,\phi}$ is a constant. Without loss the generality for the image at viewpoint $\phi$ of multiview images, the relationship between depth distortion $\Delta v_\phi$ to pixel offset $\Delta d_\phi$ can be expressed as, $$\Delta d_\phi = k_\phi \cdot \Delta v_\phi \quad (15)$$

where $\Delta d_\phi$ is either $\Delta d_{x,\phi}$ or $\Delta d_{y,\phi}$, coefficient $k_\phi$ is $k_{x,\phi}$ or $k_{y,\phi}$ as given v and distance between the given pixel (x, y) and optical center $(x_{o\phi}, y_{o\phi})$ in x or y-axis. This direct linear relationship can be suitable for parallel camera setting and also for other camera arrays, such as toed-in and two dimensional (2D) camera arrangements.

The Relationship Between Pixel-wise Offset $\Delta d_\phi$ and View Synthesis Distortion $MSE_{VS}$ According to Eq. 7, the virtual view synthesis distortion can be caused by a combination of the left and right views. The depth distortion of view $\phi$ can be due to mapping pixel-wise offset $\Delta d_\phi$ which can causes the view synthesis distortion $MSE_{VS}$ by mapping neighboring pixels. Therefore, the relationship between $MSE_\phi(\Delta d_{x,\phi}, \Delta d_{y,\phi})$ and $\Delta d_\phi$. Here, $MSE_\phi(\Delta d_{x,\phi}, \Delta d_{y,\phi})$ can be calculated as, $$MSE_\phi(\Delta d_{x,\phi}, \Delta d_{y,\phi}) = \tfrac{1}{4}(f(\Delta d_{x,\phi}/2, 0) + f(-\Delta d_{x,\phi}/2, 0) + f(0, \Delta d_{y,\phi}/2) + f(0, -\Delta d_{y,\phi}/2)), \quad (16)$$

where $$f(\Delta x, \Delta y) = \frac{1}{MN} \sum_{x=1}^{N} \sum_{y=1}^{M} [I(x,y) - I(x + \Delta x, y + \Delta y)]^2,$$

I(x, y) is the pixel value at position (x,y), and M and N are the width and the height of the image.

Figure 9:
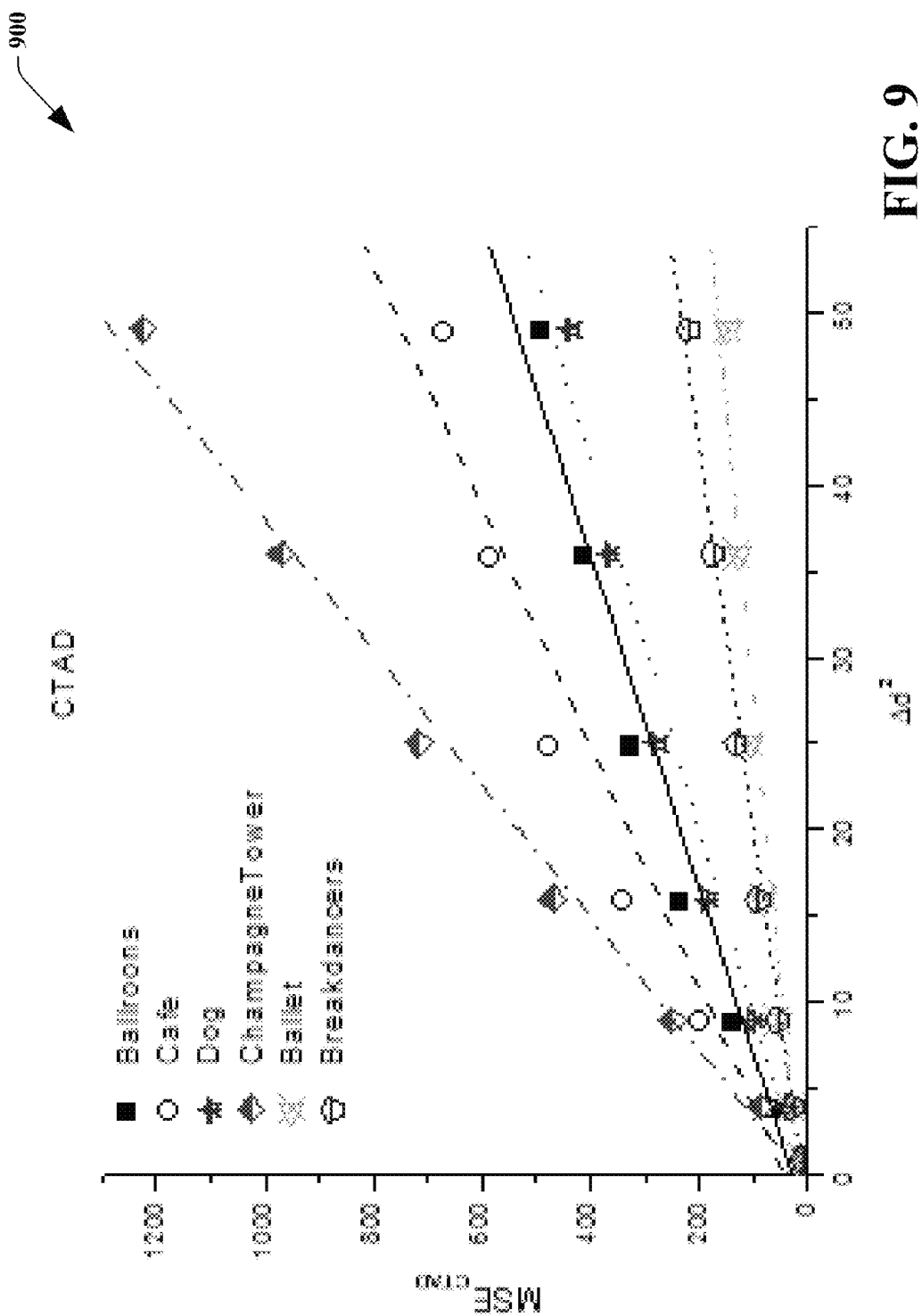
FIG. 9 illustrates a plot of exemplary data related to development of a VSDM in accordance with an aspect of the disclosed subject matter.
Figure 10:
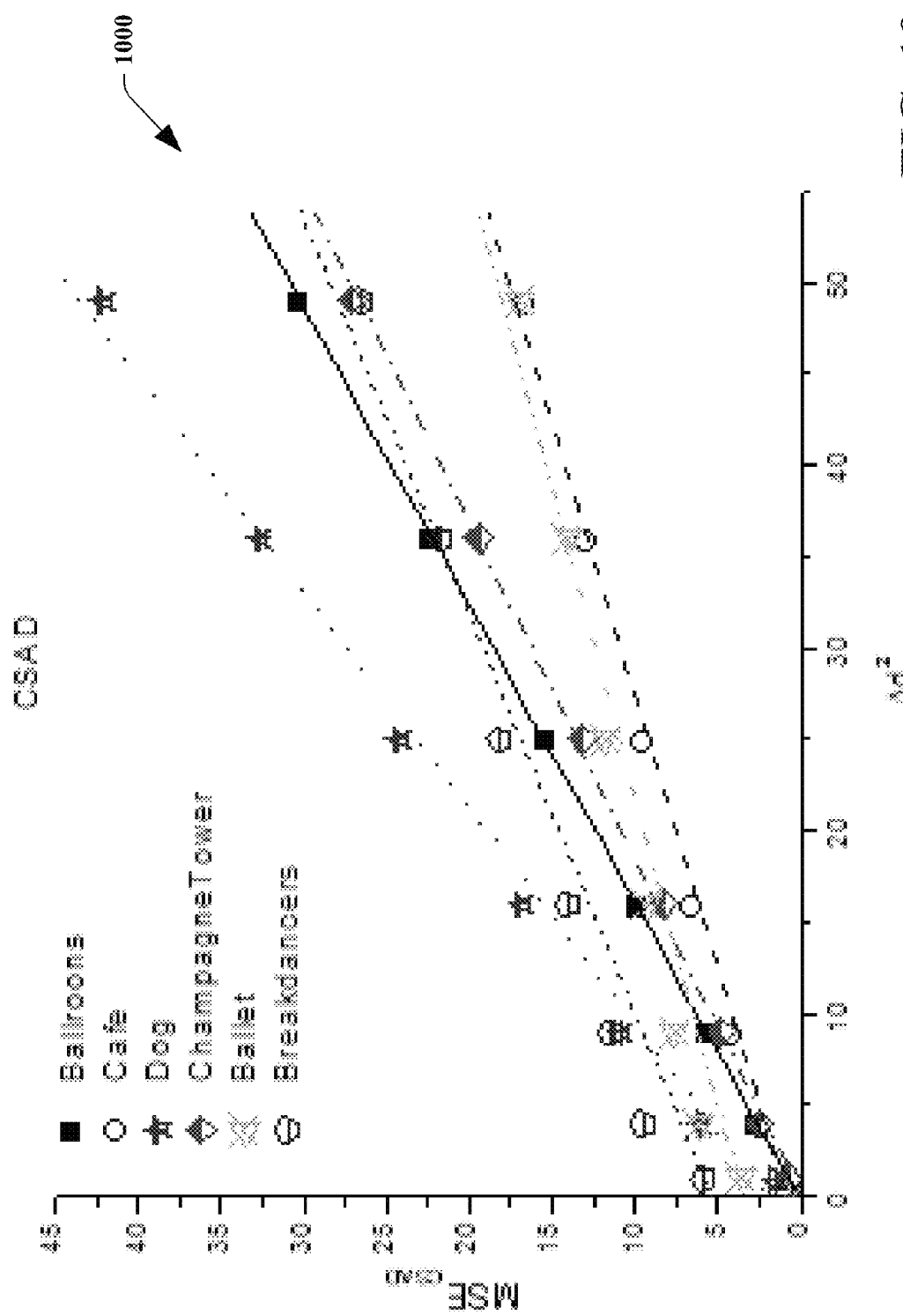
FIG. 10 depicts a plot of exemplary data related to development of a VSDM in accordance with an aspect of the disclosed subject matter.

Turning to FIGS. 9 and 10, illustrated are plots 900 and 1000 of exemplary data related to development of a VSDM in accordance with an aspect of the disclosed subject matter. Plot 900 relates to a CTAD relationship and plot 1000 relates to a CSAD relationship between offset $\Delta d_\phi$ and average MSE for different test sequences. The x-axis in each of plots 900 and 1000 is the square of $\Delta d_\phi$, where the average vertical and horizontal offset are the same, e.g., $\Delta d_\phi = \Delta d_{x,\phi} = \Delta d_{y,\phi}$. The y-axis of plot 900 is $MSE_{CTAD,\phi}(\Delta d_\phi)$. The y-axis of plot 1000 is $MSE_{CSAD,\phi}(\Delta d_\phi)$. This reduces to $MSE_\phi(\Delta d_{x,\phi}, \Delta d_{y,\phi})$ in CTAD or CSAD regions, respectively. From plot 900, the relationship between offset $\Delta d_\phi^2$ and MSE of CTAD can be approximated as a linear function while $\Delta d_\phi^2$ is small. Therefore, the function describing the relationship between MSE and $\Delta d_\phi^2$ can be calculated as, $$MSE_{CTAD,\phi}(\Delta d_\phi) = \beta_{CTAD,\phi} \cdot \Delta d_\phi^2 + \gamma_{CTAD,\phi}, \quad (17)$$

Similarly, as illustrated in plot 1000 for the CSAD regions, the relationship between $\Delta d^2$ and $MSE_{CSAD}$ is also linear, therefore, $$MSE_{CSAD,\phi}(\Delta d_\phi) = \beta_{CSAD,\phi} \Delta d_\phi^2 + \gamma_{CSAD,\phi}, \quad (18)$$

Additionally, it can be seen that the MSE of a CTA region is much larger than that of a CSA region for different offset $\Delta d_\phi$, which indicates that the distortion $MSE_{VS}$ is more easily affected by the offset in CTAD than in CSAD. The view synthesis distortion $MSE_{VS}$ is the summation of MSE in CTAD and CSAD, thus, $$MSE_{VS} = MSE_{VS,CTAD} + MSE_{VS,CSAD}, \quad (19)$$

$$\begin{aligned} MSE_{VS,\psi} &= \sum_{\phi \in \{L,R\}} \omega_\phi^2 MSE_{\phi,\psi}(\Delta d_{\phi,\psi}) \\ &= \sum_{\phi \in \{L,R\}} \omega_\phi^2 (\beta_{\psi,\phi} \cdot \Delta d_{\phi,\psi}^2 + \gamma_{\psi,\phi}) \\ &= \sum_{\phi \in \{L,R\}} \omega_\phi^2 (\beta_{\psi,\phi} \cdot (k_\phi \cdot \Delta v_{\phi,\psi})^2 + \gamma_{\psi,\phi}) \end{aligned} \quad (20)$$

where $\psi \in \{CTAD, CSAD\}$. By symmetry, where similar quantization error is introduced in each view, the depth distortion of a left view can be similar to that of a right view, e.g., $\Delta v_{L,\psi} \approx \Delta v_{R,\psi} = \Delta v_\psi$, $$MSE_{VS,\psi} = \Delta v_\psi^2 \sum_{\phi \in \{L,R\}} \beta_{\psi,\phi} \omega_\phi^2 \cdot k_\phi^2 + \sum_{\phi \in \{L,R\}} \omega_\phi^2 \gamma_{\psi,\phi}. \quad (21)$$

However, where $MSE_{D,\psi}$ is the depth distortion and it is set to $\Delta v_\psi^2$. Then the image content and texture are quite similar among views, the slope $\beta_{\psi,\phi}$ is similar among different viewpoint images and we have $\beta_\psi \approx \beta_{\psi,\phi}$, $\phi \in \{1, 2, 3, \ldots n\}$. Therefore, Eq. 21 can be rewritten, $$MSE_{VS,\psi} = A_\psi MSE_{D,\psi} + B_\psi, \quad (22)$$

where $$A_\psi = \beta_\psi \sum_{\phi \in \{L,R\}} \omega_\phi^2 \cdot k_\phi^2, \, B_\psi = \sum_{\phi \in \{L,R\}} \omega_\phi^2 \gamma_{\psi,\phi}, \, \psi \in \{CTAD, CSAD\}.$$

Of note, $A_\psi$ and $B_\psi$ are constants for a given set of view parameters, e.g., given 3D video content, camera setting, view synthesis and fusion algorithm, etc.

A General $D_{VS}$-$D_D$ Model

Figure 11:
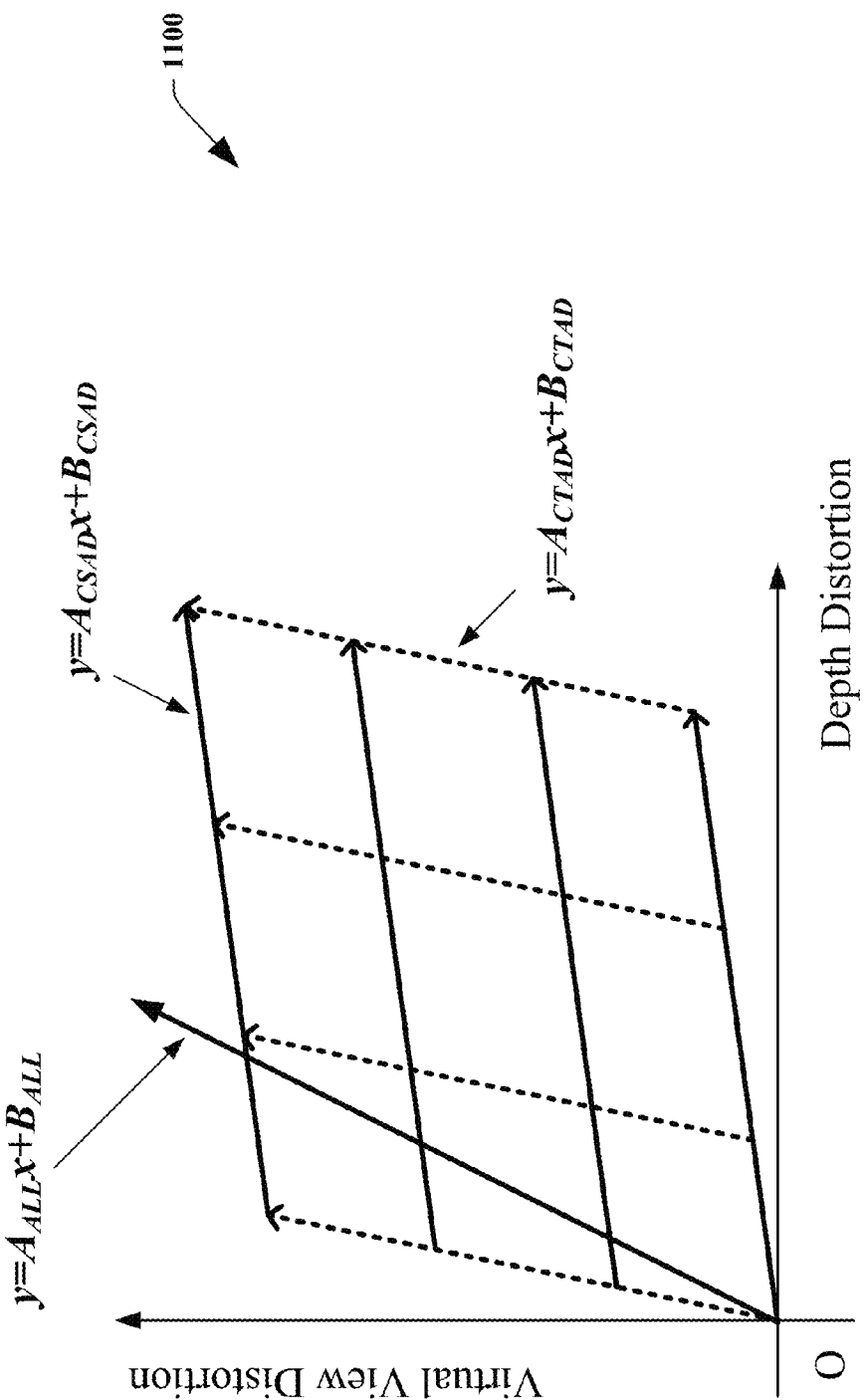
FIG. 11 illustrates a diagram of a generalized exemplary relationship between depth distortion and virtual view distortion in relation to developing a VSDM in accordance with an aspect of the disclosed subject matter.

The general relationship between depth distortions and VVI distortion can be modeled as a linear model for different regions. The depth distortion for CTAD regions can have more severe impacts on the depth distortion of CSAD regions, shown as in FIG. 11, where the dotted lines indicate the linear relationship of $D_{VS}$ and $D_D$ for CTAD regions. The solid lines indicate the linear relationship of $D_{VS}$ to $D_D$ for the CSAD regions. FIG. 11 illustrates a diagram 1100 of a generalized exemplary relationship between depth distortion and virtual view distortion in relation to developing a VSDM in accordance with an aspect of the disclosed subject matter. The relationship between distortion of synthesized virtual view $D_{VS,\psi}$ and depth distortion, $D_{D,\psi}$, can be modeled as, $$D_{VS,\psi} = A_\psi D_{D,\psi} + B_\psi, \quad (23)$$

where $\psi \in \{CTAD, CSAD, ALL\}$, 'CSAD' and 'CTAD' represents CSAD and CTAD regions, respectively, and 'ALL' for the entire image, the distortion $D_{VS,\psi}$ and $D_{D,\psi}$ are the distortion of synthesized virtual view and depth video, which can be measured by employing an MSE. Coefficient $A_\psi$ is a gradient that indicates an increasing ratio of view synthesis distortion, $B_\psi$, is a coefficient that can be correlated with depth distortion in a non-$\psi$ region. The $A_\psi$ satisfies that, $$A_{CTAD} \geq A_{ALL} \geq A_{CSAD} \text{ and } A_{ALL} = \mu \cdot A_{CSAD} + (1-\mu) A_{CTAD}, \tag{24}$$

where $\mu$ is the ratio of number of pixels in CSAD to number of pixels in the entire image. In depth video coding, the introduced quantization distortion in depth video can be converted to displacement $D_{D,\psi}$. View synthesis distortion caused by displacement $D_{D,CTAD}$ in CTAD is larger than $D_{D,CSAD}$ in CSAD, therefore, CTAD and CSAD can be coded differently due to the indication that CSAD is more durable to quantization distortion in terms of rate-view synthesis distortion than CTAD.

A General $D_{VS}$-$D_D$-Q Model and General $R_D$-Q Model

Figure 12:
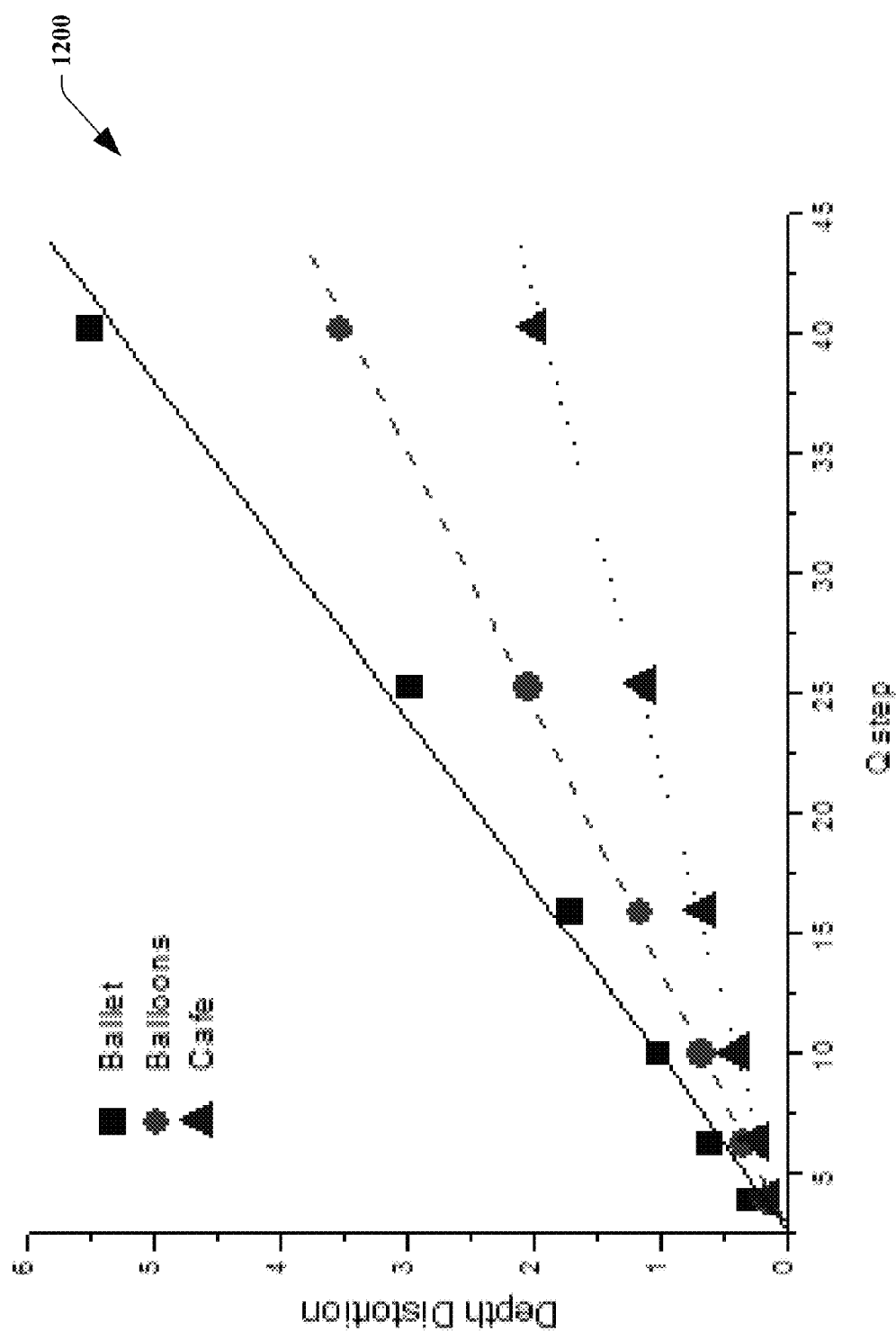
FIG. 12 illustrates a plot of exemplary depth distortion data related to development of a VSDM in accordance with an aspect of the disclosed subject matter.

FIG. 12 illustrates a plot 1200 of exemplary depth distortion data related to development of a VSDM in accordance with an aspect of the disclosed subject matter. A Cauchy distribution based D-Q model can be borrowed from color video coding in H.264/AVC as, $$D_D = \xi Q_{Step}^\beta, \tag{25}$$

The relationship between depth distortion $D_D$ and quantization step $Q_{step}$, is illustrated in plot 1200, in which the depth distortion is evaluated with MSE and it is in linear relationship with $Q_{step}$ for different test depth video sequences. Therefore, an empirical linear $D_D$-Q model is for H.264/AVC can be, $$D_D = \xi Q_{Step}, \tag{26}$$

where $\xi$ is the model parameter and for the special case of the Cauchy distribution based model with the parameter $\beta$ equal to 1. For the depth video coding, the depth video content can be regarded as a Y component of the color video. Therefore, a traditional linear D-Q model for the color video coding can also suitable for the $D_D$-Q model. Therefore, according to Eq. 26 and Eq. 23, a regional VSDM of view synthesis distortion and $Q_{step}$, a $D_{VS}$-Q model, as, $$D_{VS,\psi} = A_\psi \xi Q_{Step} + B_\psi, \tag{27}$$

where $\psi \in \{CTAD, CSAD\}$.

Figure 13:
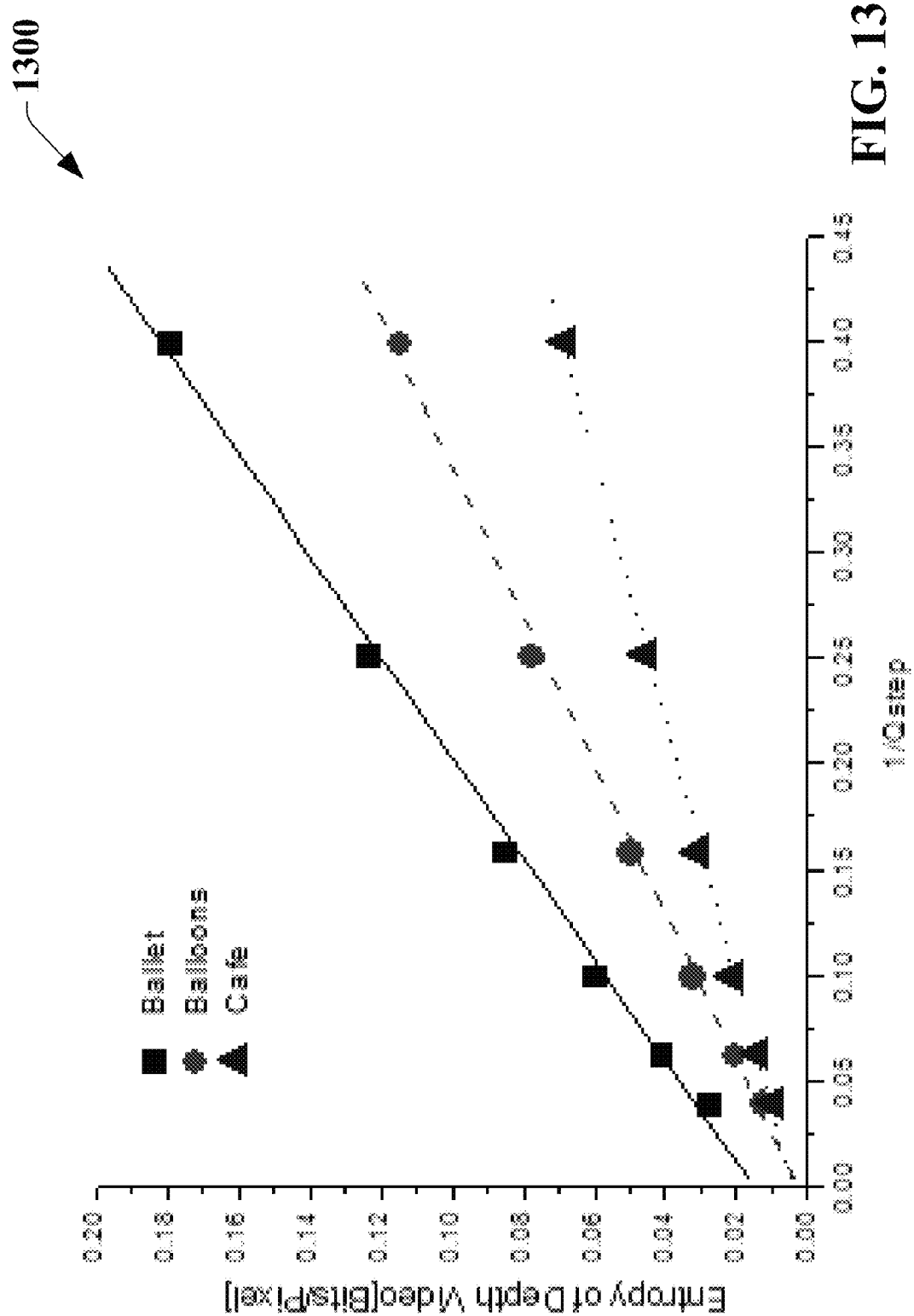
FIG. 13 illustrates a plot of exemplary depth distortion data related to development of a VSDM in accordance with an aspect of the disclosed subject matter.

FIG. 13 depicts a plot 1300 of exemplary depth distortion data related to development of a VSDM in accordance with an aspect of the disclosed subject matter. Plot 1300 illustrates a relationship between the entropy of depth bit rate and $1/Q_{step}$. In the figure, the trend lines are linearly fitted for three test sequences with different resolutions and motion properties. It can be observed that bit rate and $1/Q_{step}$ have a generally linear relationship for different MDV sequences and resolutions. Therefore, a linear $R_D$-Q model is modeled as, $$R_D = \frac{Km}{Q_{step}} + C, \tag{28}$$

where m is the Mean Absolute Difference (MAD) of the residual between the reference signal and predictive signal, K is model parameter, C is a constant indicating the header bits.

Bit Allocation Based on VSDM

Let $N_T$ and $N_S$ be the number of MBs in CTAD and CSAD for a frame, $k_T$ and $k_S$ be the MB indices in the coding order such that $k_T = 1, 2, 3 \ldots, N_T$ and $k_S = 1, 2, 3 \ldots, N_S$. Selection of $Q_{step}$ values for CTAD and CSAD, can be made to reduce the total distortion of the picture while not exceeding a total bit constraint $R_C$, that is, the number of total bits should be not larger than the number of target bits. The bit allocation problem for each frame can be stated as, $$\begin{cases} Q_T^* Q_S^* = \arg\min \left( \sum_{k_T=1}^{N_T} D_{CTAD}(k_T) + \sum_{k_S=1}^{N_S} D_{CSAD}(k_S) \right) \\ \sum_{k_T=1}^{N_T} B_{CTAD}(k_T) + \sum_{k_S=1}^{N_S} B_{CSAD}(k_S) < R_C, \end{cases} \tag{29}$$

where $B_{CTAD}(\,)$ and $B_{CSAD}(\,)$ indicate a buffer consumption of encoding bits for CTAD and CSAD MBs. A quantization solution for Eq. 29 can be determined, wherein the Largrangian multiplier is introduced to reduce the R-D cost, J, which can be expressed as, $$Q_T^* Q_S^* \lambda^* = \tag{30}$$

$$\arg\min J = \arg\min \left( \sum_{k_T=1}^{N_T} D_{CTAD}(Q_T) + \sum_{k_S=1}^{N_S} D_{CSAD}(Q_S) + \lambda \left( \sum_{k_T=1}^{N_T} B_{CTAD}(Q_T) + \sum_{k_S=1}^{N_S} B_{CSAD}(Q_S) - R_C \right) \right)$$

To get $Q_T^*$ and $Q_S^*$ values, the partial derivation of J to $Q_T$, $Q_S$ and $\lambda$ can be computed and set equal to zero, $$\begin{cases} \dfrac{\partial \sum_{k_T=1}^{N_T} D_{CTAD}(Q_T)}{\partial Q_T} + \lambda \dfrac{\partial \sum_{k_T=1}^{N_T} B_{CTAD}(Q_T)}{\partial Q_T} = 0 \\ \dfrac{\partial \sum_{k_S=1}^{N_S} D_{CSAD}(Q_T)}{\partial Q_S} + \lambda \dfrac{\partial \sum_{k_S=1}^{N_S} B_{CSAD}(Q_S)}{\partial Q_S} = 0 \\ \dfrac{\partial J}{\partial \lambda} = \sum_{k_T=1}^{N_T} B_{CTAD}(Q_T) + \sum_{k_S=1}^{N_S} B_{CSAD}(Q_S) - R_C = 0, \end{cases} \tag{31}$$

Eq. 31 can be solved to obtain $Q_{step}$ for CTAD and CSAD, $Q_T^*$ and $Q_S^*$, as, $$Q_T^* = K\sqrt{\overline{m}_T} \frac{\sqrt{\overline{m}_T} + \sqrt{\dfrac{A_{CSAD}}{A_{CTAD}}} \sqrt{\overline{m}_S}}{R_c - C_{CTAD} - C_{CSAD}}, \tag{32}$$

$$Q_S^* = K\sqrt{\overline{m}_S} \frac{\sqrt{\dfrac{A_{CTAD}}{A_{CSAD}}} \sqrt{\overline{m}_T} + \sqrt{\overline{m}_S}}{R_c - C_{CTAD} - C_{CSAD}} = \sqrt{\dfrac{A_{CTAD} \overline{m}_S}{A_{CSAD} \overline{m}_T}} Q_T^*, \tag{33}$$

where $\overline{m}_T$ and $\overline{m}_S$ are the average MAD of CTAD and CSAD regions, respectively, which are $$\overline{m}_T = \frac{1}{N_T} \sum_{k_T=1}^{N_T} m_{CTAD}(k_T) \text{ and } \overline{m}_S = \frac{1}{N_S} \sum_{k_S=1}^{N_S} m_{CSAD}(k_S).$$

Rate-distortion Adaptation for View Synthesis Oriented Depth Video Coding

Where the depth video is coded with traditional H.264/AVC based video coding standard as color video due to its similar transformed coefficients distribution, a traditional R-D model can also be applied to depth video coding as, $$R(D) = k \ln\left(\frac{\sigma^2}{D}\right), \quad (34)$$

where D is output distortion and $\sigma^2$ is an input picture variance. Taking the derivative of R(D) with respect to D and setting its value to $-1/\lambda_{MODE}$ yields, $$\frac{dR(D)}{dD} \equiv -\frac{1}{\lambda_{MODE}}. \quad (35)$$

Substituting Eq. 34 into Eq. 35 and solving, yields the Lagrangian multiplier as, $$\lambda_{MODE} = \frac{1}{k}D. \quad (36)$$

The reconstructed depth video can be used to generate a virtual view, and thus, the distortion of synthesized virtual view, $D_{VS}$, can be actually taken into account in a distortion model. The compressed depth video bit rate, $R_D$, is actually transmitted, that is $R_D(D_{VS})$ is equal to $R_D(D_D)$. Therefore, the relationship between $R_D$ and $D_{VS}$ can be formulated as, $$R_D(D_{VS}) = R_D(D_D) = k_D \ln\left(\frac{\sigma_D^2}{D_D}\right), \quad (37)$$

where $k_D$ is a weighted coefficient, $D_D$ is an output distortion and $\sigma_D$ is an input picture variance for depth video. Statistically, this is similar to the Y component of color video. Similarly, to calculate the Lagrangian factor for a view synthesis R-D model ($\lambda_{MODE}^{VS}$), the derivative of $R_D(D_{VS})$ can be taken with respect to $D_{VS}$ and setting its value to $$-\frac{1}{\lambda_{MODE}^{VS}}$$

yields, $$\frac{dR(D_{VS})}{dD_{VS}} = \frac{dR(D_D)}{dD_{VS}} = \frac{dR(D_D)}{d(A_{ALL}D_D + B_{ALL})} \equiv -\frac{1}{\lambda_{MODE}^{VS}}, \quad (38)$$

which can be solved to obtain, $$-\frac{k/A_{ALL}}{D_D} = -\frac{1}{\lambda_{MODE}^{VS}}, \quad (39)$$

Eq. 36 can then be applied to Eq. 39, where the D in Eq. 36 is set equal to $D_D$ for the depth video coded by the H.264/AVC based video codec. As such, the VSDM based Lagrangian multiplier for mode decision and reference frame selection can be, $$\lambda_{MODE}^{VS} = A_{ALL}\lambda_{MODE}, \quad (40)$$

The VSDM based Lagrangian multiplier for motion/disparity estimation can be, $$\lambda_{MOTION}^{VS} = \sqrt{A_{ALL}}\lambda_{MOTION}, \quad (41)$$

where $\lambda_{MODE}$ and $\lambda_{MOTION}$ are Lagrangian multipliers for mode decision and motion/disparity estimation in a traditional H.264 based video codec, respectively. Based on general R-D optimization theory, an optimization target is to minimize the new $R_D$ and $D_{VS}$ cost function, which is represented as $$\min J_{VS}, J_{VS} = D_{VS} + \lambda^{VS}R_D = A_\psi D_D + A_{ALL}\lambda R_D + B_\psi, \quad (42)$$

where $\psi \in \{CTAD, CSAD\}$, $B_\psi$ can be a constant. Using a traditional H.264/AVC based codec to encode the depth video, the distortion part is can be evaluated with depth distortion $D_D$. Thus, Eq. 42 can be rewritten as, $$\min J, J = D_D + \frac{A_{ALL}}{A_\psi}\lambda R_D. \quad (43)$$

Eq. 43 suggests that a VSDM based Lagrangian multiplier can be $(A_{ALL}/A_\psi)\lambda$, when a conventional H.264/AVC based video codec is employed to encode the depth content.

VSDM Based MDVC and Model Parameter Estimation

The calculation of $Q_{step}$ in Eq. 33, is at least partially dependent on determining $A_{CTAD}/A_{CSAD}$ first. Wherein Wherein $$A_\psi = \beta_\psi \sum_{\phi \in \{L,R\}} \omega_\phi^2 \cdot k_\phi^2, \psi \in \{CTAD, CSAD\} \text{ and } \sum_{\phi \in \{L,R\}} \omega_\phi^2 \cdot k_\phi^2$$

is constant for given multiview input stream, $A_{CTAD}/A_{CSAD}$ can be, $$\frac{A_{CTAD}}{A_{CSAD}} = \frac{\beta_{CTAD}}{\beta_{CSAD}}, \quad (44)$$

where $\beta_{CTAD}$ and $\beta_{CSAD}$ can be calculated by using linear regression with the statistical image analyses data. Based on Eq. 24 and Eq. 44, parameters $A_{ALL}/A_{CTAD}$ and $A_{ALL}/A_{CSAD}$ can be represented by, $$\frac{A_{ALL}}{A_{CTAD}} = \mu\frac{\beta_{CSAD}}{\beta_{CTAD}} + 1 - \mu \quad (45)$$

$$\frac{A_{ALL}}{A_{CSAD}} = \mu + (1-\mu)\frac{\beta_{CTAD}}{\beta_{CSAD}},$$

Whereas the image texture of the multiview video is often stable for much of a GOP, the model parameter $\beta_{CTAD}$ and $\beta_{CSAD}$ can simply be updated once for every GOP of a view for both low complexity and accuracy consideration.

Figure 14:
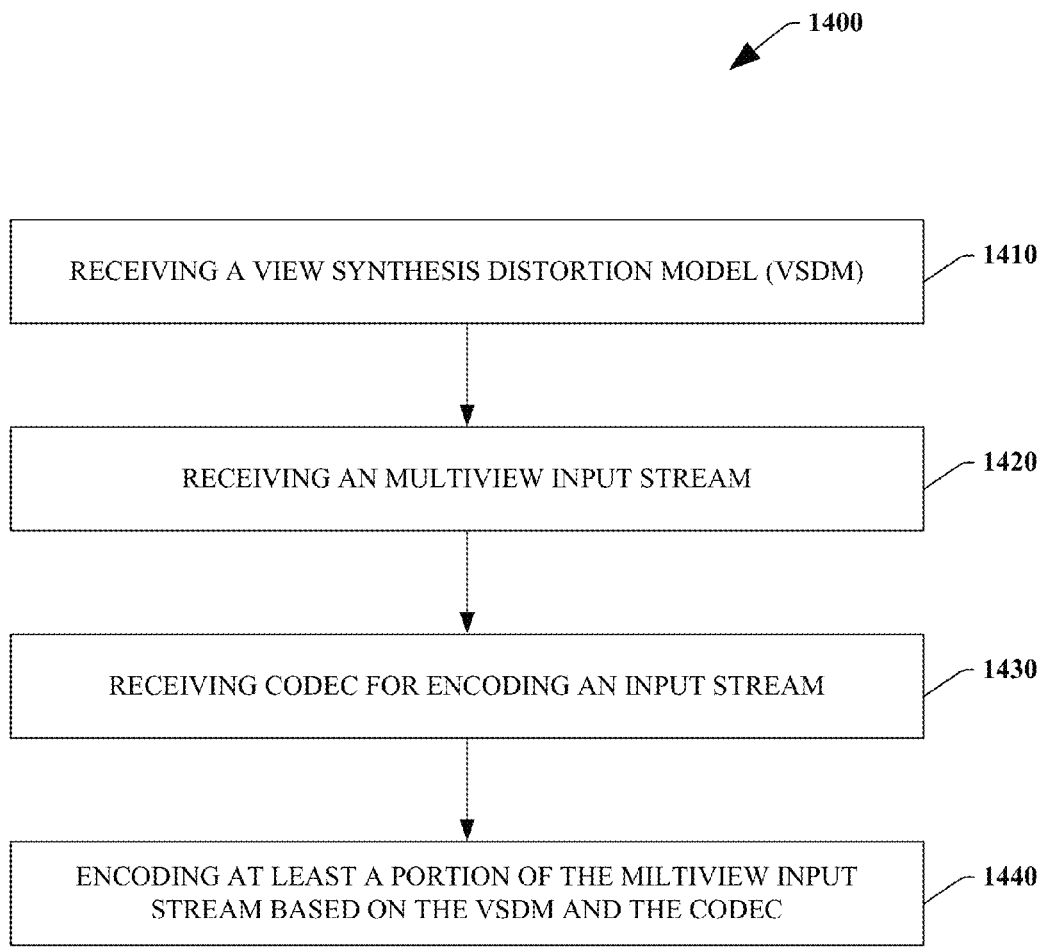
FIG. 14 illustrates a method that facilitates MVC based on a VSDM in accordance with an aspect of the disclosed subject matter.

FIG. 14 illustrates a method 1400 that facilitates MVC based on a VSDM in accordance with an aspect of the disclosed subject matter. At 1410, a VSDM can be received. The VSDM can embody relationships between depth distortion and virtual view image distortion. Parameters values of a VSDM can be employed in coding an input stream into an encoded output stream. At 1420, method 1400 can receive a multiview input stream. A multiview input stream can include a plurality of view information. A multiview input stream can also include depth information correlated to video information.

At 1430, a codec for encoding an input stream can be received. In an aspect, the codec can be a H.264/AVC codec. The codec can facilitate coding of an input stream into an encoded output stream. In an aspect the codec can accept parameter values that alter the particular coding process in response to the parameter values. At 1440, at least a portion of the multiview input stream can be encoded based on the VSDM and the codec. At this point method 1400 can end.

In an aspect, the multiview input stream can include video frames and depth frames. Regions of the video frames can be selected based on texture in the macroblocks. These regions in the video frames can be associated with textured characteristics or smooth characteristics based on a threshold value. Regions of the video frame associated with textured characteristics can be labeled CTA and those associated with smooth characteristics can be labeled CSA. Corresponding regions can then be selected from the depth frames. The regions corresponding to the CTA regions can be labeled CTAD and those corresponding to the CSA regions can be labeled CSAD.

The VSDM can include parameters including a slope parameter and an average mean absolute difference residual measurement. These parameter values can be employed in determining quantization values and bit rate values. The VSDM can be applied to the CTAD and CSAD regions to facilitate coding of depth frame information. Encoding depth frame information can reduce the bandwidth used to transmit depth frame information at a selected quality level.

Figure 15:
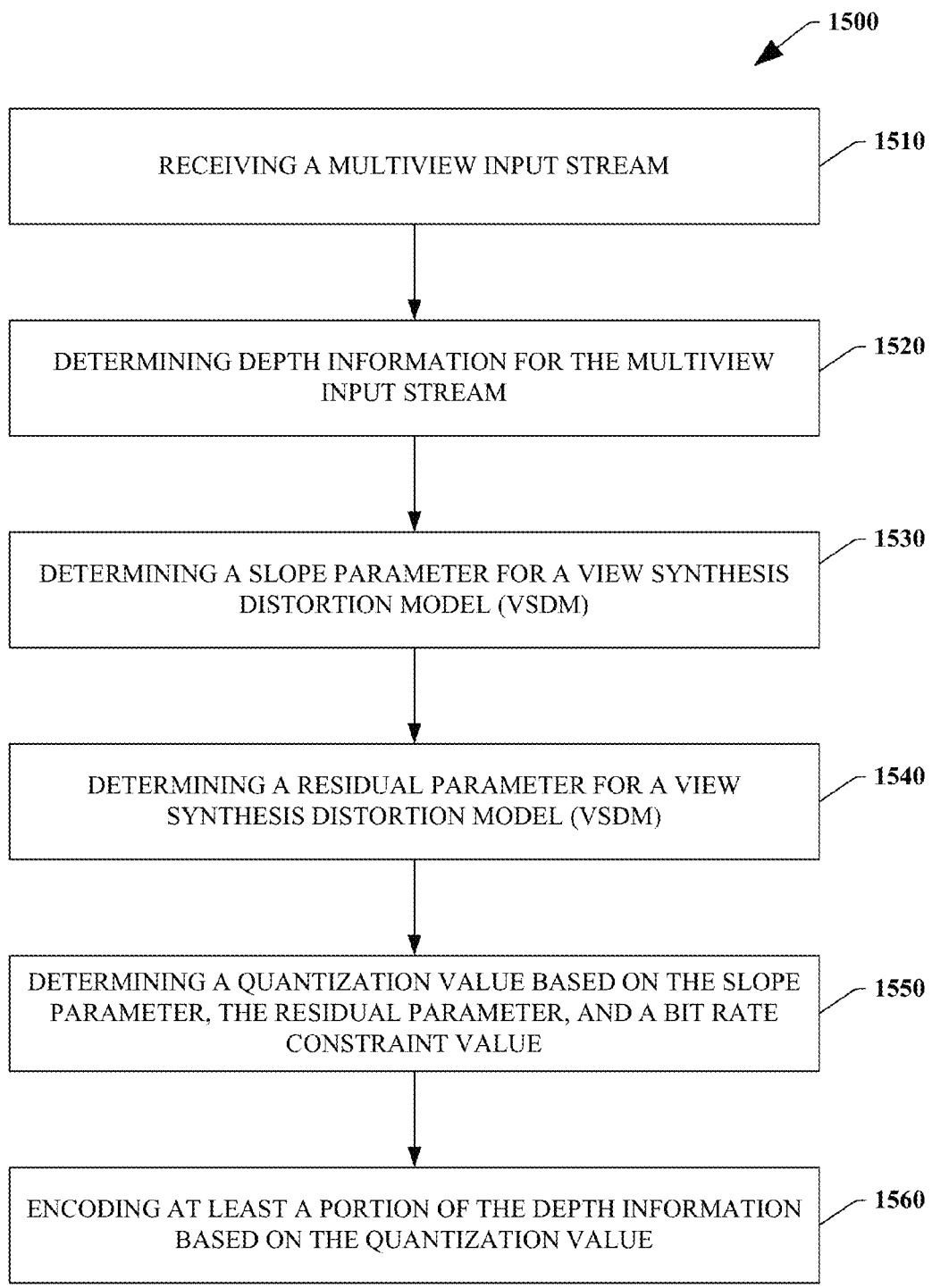
FIG. 15 illustrates a method that facilitates MVC based on a VSDM in accordance with an aspect of the disclosed subject matter.

FIG. 15 illustrates a method 1500 that facilitates MVC based on a VSDM in accordance with an aspect of the disclosed subject matter. At 1510, a multiview input stream can be received. At 1520 depth information for the multiview input stream can be determined. In an aspect determining depth information at 1520 can include receiving predetermined depth information.

At 1530, a slope parameter for a VSDM can be determined. In an embodiment the slope parameter can be determined using liner regression. In other embodiments, the slope parameter can be determined using other fitting or modeling techniques without departing from the scope of the presently disclosed subject matter. The linear regression can be applied to data correlating quantization error in the depth frame to view synthesis distortion. Image analysis to determine slope parameter can be performed for regions of the depth information, e.g., CTAD and CSAD regions. Moreover, the slope parameter can be determined for each frame, a set of frames, of a GOP. Typically the more texture variation in the video portion of a multiview input stream the more frequent the slope information will be determined to remain relevant to the coding process.

At 1540, a residual parameter can be determined for the VSDM. In an aspect, the residual parameter can be determined from motion complexity analysis. Other techniques are also possible, including frame difference techniques, etc. At 1550, a quantization value can be determined for encoding the depth information of the multiview input stream. The quantization value can be based on the slope parameter, the residual parameter, and a bit rate constraint value. At 1560, at least a portion of the depth information of the multiview input stream can be encoded. The encoding can be based on the determined quantization value. At this point method 1500 can end.

Figure 16:
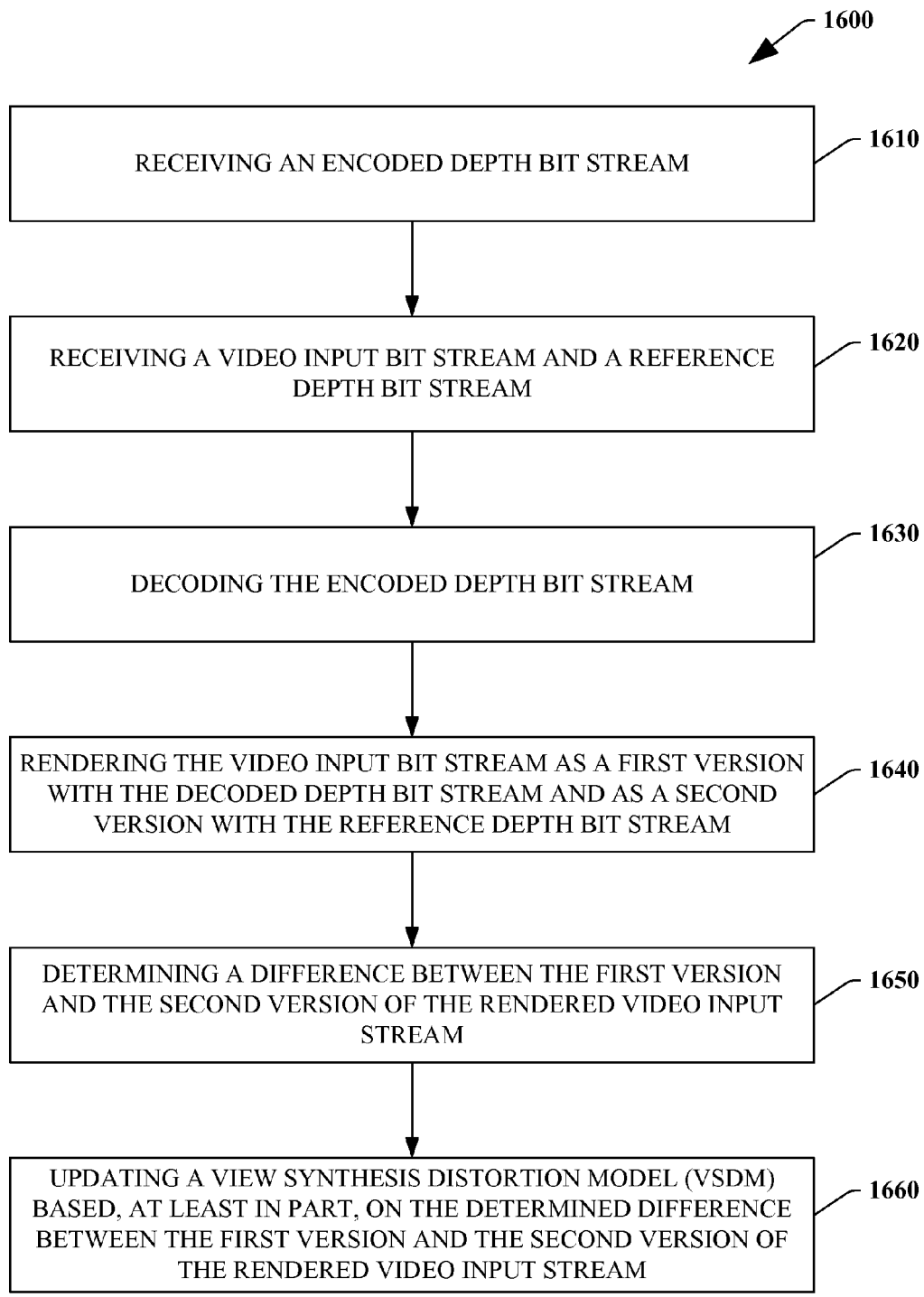
FIG. 16 depicts a method that facilitates updating a VSDM in accordance with an aspect of the disclosed subject matter.

FIG. 16 illustrates a method 1600 that facilitates updating a VSDM in accordance with an aspect of the disclosed subject matter. At 1610, an encoded depth bit stream can be received. The encoded depth bit stream can constitute encoded depth information. At 1620, a video bit stream and a reference depth bit stream can be received. The reference depth bit stream can constitute the uncompressed depth information corresponding to the encoded depth bit stream. At 1630, the encoded depth information can be decoded from the encoded depth bit stream received at 1610.

At 1640, the video input bit stream can be rendered into a first version by employing the decoded depth bit stream and as a second version by employing the reference depth bit stream. As such, the first version can be a rendering employing a coded version of the depth bit stream and the second version can be a rendering of the same video content employing an uncompressed version of the depth bit stream. Thus, the second version can represent the best quality rendering and act as a benchmark for determining the performance of the coding of the received depth bit stream. As an example, where the coding of the received depth bit stream is poorly executed, the resulting version of the rendering will be poor in comparison to the rendering employing the reference depth bit stream. As a second example, where the coding of the depth bit stream is performed well, the first rendered version can be a close facsimile of the rendering employing the reference depth bit stream.

At 1650, a difference between the first and second versions of the rendered video input stream can be determined. In an aspect, this can be related to an analysis of residual values for a curve fitting process. In an embodiment, the difference can be measured as a peak signal-to-noise ratio (PSNR) calculation. At 1660, a VSDM can be updated based on the determined difference between the first and second version of the rendered video input stream. In an aspect, this can be associated with employing corrective feedback to update and improve the VSDM to facilitate better coding of the depth bit stream to result in a particular quality level for the difference between the first and second versions of the rendered video input stream at a particular bit-rate. At this point, method 1600 can end.

Figure 17:
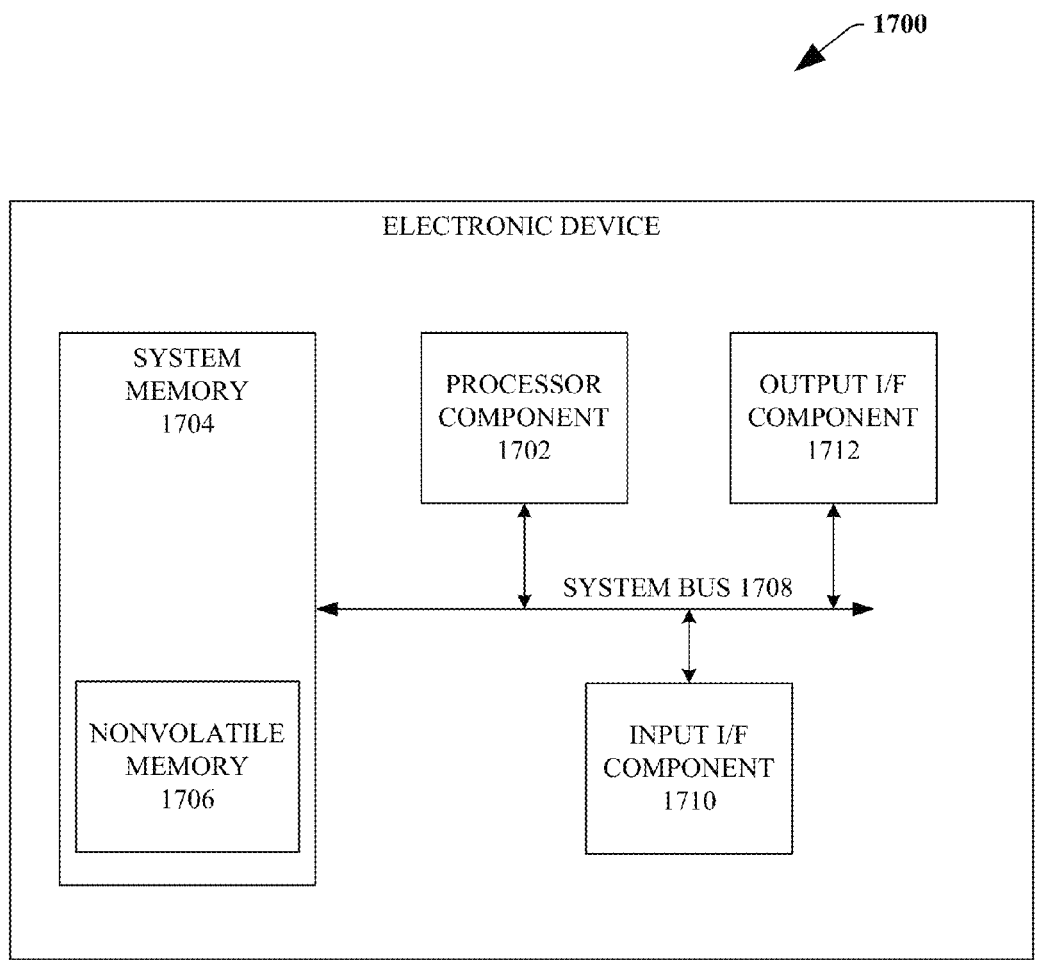
FIG. 17 illustrates a block diagram of an exemplary electronic device that can facilitate panoramic stereo catadioptric imaging in accordance with an aspect of the disclosed subject matter.

Referring to FIG. 17, illustrated is a block diagram of an exemplary, non-limiting electronic device 1700 that can facilitate content transcoding in accordance with an aspect of the disclosed subject matter. The electronic device 1700 can include, but is not limited to, a computer, a server, a laptop computer, a server, a dedicated spatial processing component or device, or network equipment (e.g. routers, access points, femtocells, picocells), and the like.

Components of the electronic device 1700 can include, but are not limited to, a processor component 1702, a system memory 1704 (with nonvolatile memory 1706), and a system bus 1708 that can couple various system components including the system memory 1704 to the processor component 1702. The system bus 1708 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1704 can include computer-readable storage media in the form of volatile and/or nonvolatile memory 1706. A basic input/output system (BIOS), containing the basic routines that help to transfer information between elements within electronic device 1700, such as during start-up, can be stored in memory 1704. Memory 1704 can typically contain data and/or program modules that can be immediately accessible to and/or presently be operated on by processor component 1702. By way of example, and not limitation, system memory 1704 can also include an operating system, application programs, other program modules, and program data. As a further example, system memory can include program modules for subchannel assignment and allocation of power as disclosed hereinabove. In some embodiments memory 1704 can store a view synthesis distortion model (VSDM), VSDM parameters, results of computations related to a VSDM, performance metrics for encoded depth information, or other results pertaining to multiview video coding based on a view synthesis distortion model. As an example, a VSDM can be stored in memory 1704. Continuing the example, processor 1702 can process the stored system geometry and store a resulting set of parametric panoramic stereo catadioptric imaging model values in memory 1704. These exemplary models, parameters, and values can be employed in coding multiview depth video content in accordance with the presently disclosed subject matter.

The nonvolatile memory 1706 can be removable or non-removable. For example, the nonvolatile memory 1706 can be in the form of a removable memory card or a USB flash drive. In accordance with one aspect, the nonvolatile memory 1706 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1700 through input devices (not illustrated) such as a keypad, microphone, tablet or touch screen although other input devices can also be utilized. These and other input devices can be connected to the processor component 1702 through input interface component 1710 that can be connected to the system bus 1708. Other interface and bus structures, such as a parallel port, game port or a universal serial bus (USB) can also be utilized. A graphics subsystem (not illustrated) can also be connected to the system bus 1708. A display device (not illustrated) can be also connected to the system bus 1708 via an interface, such as output interface component 1712, which can in turn communicate with video memory. In addition to a display, the electronic device 1700 can also include other peripheral output devices such as speakers (not illustrated), which can be connected through output interface component 1712. In an aspect, other electronic devices, e.g., terminal devices can be communicatively coupled to electronic device 1700 by way of input interface component 1710 and output interface component 1712, which can serve to facilitate transfer of transcoded content streams.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those implicating physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim. Moreover, the term "or" is intended to be an "inclusive or" and not an "exclusive or", unless otherwise indicated.

What is claimed is:

1. A system, comprising:
   at least one memory that stores computer-executable instructions; and
   at least one processor, communicatively coupled to the at least one memory, that facilitates execution of the computer-executable instructions to at least:
      receive an encoder configured to encode a first portion of a multiview depth information input stream associated with depth information for a smooth region of a scene differently than a second portion of the multiview depth information input stream associated with other depth information for a texture region of the scene;
      receive a view synthesis distortion model comprising a first slope region corresponding to the depth information for the smooth region and a second slope region corresponding to the other depth information for the texture region, a first slope value of the first slope region is updated based on pixel distortion related to perturbing pixel position in the smooth region, and a second slope value of the second slope region is updated based on pixel distortion related to perturbing pixel position in the texture region;
      encode the first portion of the multiview depth information input stream based on the encoder and the first slope value; and
      encode the second portion of the multiview depth information input stream based on the encoder and the second slope value, different from the first slope value.

2. The system of claim 1, wherein the encoder is a moving picture experts group (MPEG) codec.

3. The system of claim 2, wherein the encoder is an H.264/advanced video coding (AVC) codec.

4. The system of claim 1, wherein the multiview depth information input stream includes a plurality of contemporaneous disparate views of a scene facilitating a determination of depth information for an object in the scene.

5. The system of claim 1, wherein the multiview depth information input stream includes predetermined depth information about an object in the scene and wherein the view synthesis distortion model comprises a parameter determined from intermittently injecting a determined level of noise into the multiview depth information input stream.

6. The system of claim 1, wherein the view synthesis distortion model includes a slope parameter related to a texture complexity of the scene.

7. The system of claim 6, wherein the slope parameter correlates a rendered view error to a depth information error with the texture complexity of the scene.

8. The system of claim 7, wherein the depth information error results, at least in part, from an error in a quantization of depth information.

9. The system of claim 1, wherein the view synthesis distortion model includes a residual parameter that correlates an average mean absolute difference of a residual between a reference signal and a predictive signal.

10. The system of claim 1, wherein the at least one processor further facilitates the execution of the computer-executable instructions to determine a quantization parameter based on a slope value of the view synthesis distortion model.

11. The system of claim 1, wherein the at least one processor further facilitates the execution of the computer-executable instructions to determine a bit rate value based, at least in part, on a rate-distortion model employing reconstructed depth information.

12. The system of claim 1, wherein the at least one processor further facilitates execution of the computer-executable instructions to at least:
   decode at least a portion of the encoded first portion of the multiview depth information input stream to generate at least a decoded first portion;
   render at least the decoded first portion of the multiview depth information input stream as a current render; and
   update the view synthesis distortion model based, at least in part, upon a comparison of the current render with a reference render.

13. A method, comprising:
   receiving, by a system including a processor, an encoder facilitating encoding of a smooth region of a scene comprised in a multiview input stream and differently encoding of a texture region of the scene; and
   encoding, by the system, the multiview input stream based, at least in part, on a first slope value determined from a view synthesis distortion model and the encoder, wherein the view synthesis distortion model comprises distortion values corresponding to shifts in positions for pixels of the smooth region and other distortion values corresponding to other shifts in positions for pixels of the texture region to facilitate determining the first slope value for the smooth region different from a second slope value for the texture region.

14. The method of claim 13, wherein receiving the encoder includes receiving a moving picture experts group (MPEG) codec.

15. The method of claim 14, wherein receiving the encoder includes receiving a H.264/ advanced video coding (AVC) codec.

16. The method of claim 13, further comprising:
receiving, by the system, the multiview input stream including receiving a plurality of contemporaneous disparate views of a scene facilitating determination of depth information for an object in the scene.

17. The method of claim 13, further comprising:
receiving, by the system, a multiview input stream including receiving predetermined depth information for an object in the scene.

18. The method of claim 13, further comprising:
receiving, by the system, the view synthesis distortion model including receiving a slope parameter.

19. The method of claim 13, further comprising:
receiving, by the system, the view synthesis distortion model including receiving a residual parameter that correlates an average mean absolute difference of a residual between a reference signal and a predictive signal.

20. The method of claim 13, further comprising:
determining, by the system, a quantization value based on a slope parameter of the view synthesis distortion model.

21. The method of claim 13, further comprising:
determining, by the system, a bit rate value based, at least in part, on a rate-distortion model employing reconstructed depth information.

22. The method of claim 13, further comprising:
decoding, by the system, the encoded multiview input stream;
rendering, by the system, the decoded multiview input stream into a version;
analyzing, by the system, the version relative to a reference version; and
updating, by the system, the view synthesis distortion model based, at least in part, upon the analyzing.

23. A computer-readable storage device having executable instructions that, in response to execution, cause a device including a processor to perform operations, comprising:
receiving an encoder facilitating encoding of a smooth region of a scene corresponding to a first portion of a multiview depth input stream and differently encoding a textured region of the scene corresponding to a second portion of the multiview depth input stream; and
encoding the first portion of the multiview depth input stream based at least in part on a first portion of a view synthesis distortion model and the encoder, encoding the second portion of the multiview depth input stream based at least in part on a second portion of the view synthesis distortion model and the encoder, wherein the first portion of the view synthesis distortion model comprises a parameter determined from pixel distortion related to perturbing pixel position in the smooth region, and the second portion of the view synthesis distortion model comprises another parameter determined from pixel distortion related to perturbing pixel position in the texture region.

24. The computer-readable storage device of claim 23, the operations further comprising:
decoding the encoded first portion of the multiview depth input stream;
rendering the decoded first portion of the multiview depth input stream as a version;
forming an evaluation of the version against a reference version; and
updating the view synthesis distortion model based, at least in part, upon the evaluation.

25. A system, comprising:
means for receiving a multiview input stream including depth information for a smooth portion of a scene and a texture portion of a scene;
means for receiving an encoder for encoding at least a portion of the multiview input stream;
means for receiving a view synthesis distortion model comprising a first slope region corresponding to the smooth portion and a second slope region corresponding to the texture portion, the first slope region being updatable based on pixel distortion related to perturbing pixel position in the smooth portion, and the second slope region being updatable based on pixel distortion related to perturbing pixel position in the texture portion;
means for adapting the first view synthesis distortion model based on intermittent injection of a determined level of noise into the multiview input stream to facilitate correction of a quantization parameter and a rate-distortion adaptation parameter; and
means for encoding at least the portion of the multiview input stream based on the encoder and the first and second slope regions of the view synthesis distortion model.

* * * * *